(12) United States Patent
Kakitani

(10) Patent No.: US 10,829,315 B2
(45) Date of Patent: Nov. 10, 2020

(54) MOLDED PRODUCT CONVEYING DEVICE

(71) Applicant: KIKUSUI SEISAKUSHO LTD., Kyoto (JP)

(72) Inventor: Tomohiro Kakitani, Kyoto (JP)

(73) Assignee: KIKUSUI SEISAKUSHO LTD., Kyoto (JP)

( * ) Notice: Subject to any disclaimer, the term of this patent is extended or adjusted under 35 U.S.C. 154(b) by 132 days.

(21) Appl. No.: 16/212,530

(22) Filed: Dec. 6, 2018

(65) Prior Publication Data
US 2019/0193953 A1 Jun. 27, 2019

(30) Foreign Application Priority Data

Dec. 25, 2017 (JP) ................................. 2017-247936

(51) Int. Cl.
| | | |
|---|---|---|
| *B65G 47/84* | (2006.01) | |
| *B65G 29/00* | (2006.01) | |
| *B65G 47/91* | (2006.01) | |
| *B30B 11/08* | (2006.01) | |
| *B30B 15/32* | (2006.01) | |

(52) U.S. Cl.
CPC ............ *B65G 47/848* (2013.01); *B30B 11/08* (2013.01); *B30B 15/32* (2013.01); *B65G 29/00* (2013.01); *B65G 47/915* (2013.01); *B65G 2201/027* (2013.01)

(58) Field of Classification Search
CPC .... B65G 29/00; B65G 47/848; B65G 47/915; B65G 2201/027; B30B 11/08; B30B 15/32
See application file for complete search history.

(56) References Cited

U.S. PATENT DOCUMENTS

| | | | | |
|---|---|---|---|---|
| 5,661,249 | A | * | 8/1997 | Rupp ........................ B07C 5/36 73/45 |
| 9,728,433 | B2 | * | 8/2017 | Harada ............. H01L 21/67721 |
| 10,632,702 | B2 | * | 4/2020 | Shimada ............. B30B 15/0023 |
| 10,632,704 | B2 | * | 4/2020 | Kakitani ............... B30B 15/022 |
| 2017/0151743 | A1 | | 6/2017 | Shimada et al. |
| 2017/0266853 | A1 | | 9/2017 | Shimada et al. |
| 2020/0140210 | A1 | * | 5/2020 | Bertoldo .............. A24D 3/0216 |

FOREIGN PATENT DOCUMENTS

| | | |
|---|---|---|
| JP | H 10-74673 A | 3/1998 |
| JP | 2017-104902 A | 6/2017 |
| JP | 2017-164786 A | 9/2017 |

* cited by examiner

*Primary Examiner* — Gene O Crawford
*Assistant Examiner* — Keith R Campbell
(74) *Attorney, Agent, or Firm* — McGinn I.P. Law Group, PLLC

(57) ABSTRACT

A molded product conveying device configures to suck a molded product to a rotator rotating about a predetermined rotary axis and to convey the molded product along a rotation orbit. The conveying device includes a pocket disposed along an outer circumference of the rotator, recessed inward and opened outward radially and perpendicularly to the rotary axis, and fed therein with negative pressure to suck the molded product, and a suction bore positioned to confront the pocket at a first end or a second end along the rotary axis of the rotator, opened toward the pocket to be at least partially overlapped with the pocket when viewed along the rotary axis, and fed therein with a negative pressure to suck the molded product.

20 Claims, 12 Drawing Sheets

MOLDED PRODUCT CONVEYING DEVICE

BACKGROUND

There has been known a rotary compression-molding machine including a die table of a turret having die bores, an upper punch and a lower punch slidably retained above and below each of the die bores, and configured to horizontally rotate the die table and the punches together to compression mold (or to make tablet) a powdery material filled in the die bores when the paired upper and lower punches pass between an upper roll and a lower roll. The molding machine of this type is applied, for example, to produce pharmaceutical tablets, food products, electronic components, and the like.

Each molded product is subjected to various post processes. Examples of the post processes include inspecting the molded product as to whether or not the molded product has a defective exterior, removing dust adhering to the molded product, inspecting the molded product in terms of volume, weight, or components, inspecting as to whether or not the molded product contains any alien metal, typing, printing, or engraving on the exterior of the molded product, and wrapping the molded product. As disclosed in JP 2017-164786 A, there has recently been an attempt to continuously execute from molding a product to applying a post process by connecting the compression-molding machine with a downstream device or equipment configured to execute the post process.

The lower punches push upward products molded in the die bores of the compression-molding machine to become flush with an upper surface of the die table. The molded products are then caught by a guide member positioned to confront the upper surface of the die table, are guided to a gutter chute slanted downward, and fall along the gutter chute to be delivered to the device or the equipment configured to execute the post process. A device or an equipment configured to execute certain processing and another device or equipment configured to execute subsequent processing are ordinarily connected via a gutter chute for delivery of the molded products.

Such a technique obviously causes gradual decrease in height of the molded products and thus requires disposition of a lift configured to halfway lift upward the molded products. Furthermore, the molded products fall onto chutes repeatedly and may thus hit an inner wall or a bottom wall of the chute or collide with each other to be damaged by being broken, chipped, abraded, or the like. In particular, molded products having less hardness such as orally disintegrating tablets (i.e., OD tablets that disintegrate with saliva or a small amount of water in an oral cavity) or chewable tablets (that are crunched in an oral cavity) are seriously damaged by falling.

Furthermore, the molded products become not aligned in the order of molding by the compression-molding machine while being transported via the chute. Upon tableting failure (i.e., binding or sticking) with the powdery material kept adhering to a specific one of the die bores or the punches of the compression-molding machine to cause a chipped molded product or mold trouble such as chipping at a tip of one of the punches, a normal molded product and a defective molded product are mixed to be indistinguishable from each other. A large number of molded products are thus entirely required to be discarded in this case.

In view of this, there has been developed a conveying device configured to convey molded products kept aligned in the order of molding by a compression-molding machine, as disclosed in JP 2017-104902 A. This conveying device includes a rotator configured to horizontally rotate about a vertical axis and having a large number of bores disposed in an outer circumferential portion, and is configured to capture a molded product in each of the bores and to convey the molded product along a rotation orbit.

If a device configured to apply a post process to the molded product is added at a predetermined position on the rotation orbit as a travel locus of the molded products to be conveyed, then the post process can sequentially be applied to each of the molded products being conveyed.

For appropriate application of the post process to the molded products conveyed by the conveying device, particularly inspection of the molded products, typing on exteriors of the molded products, and the like, the molded products are desired to be constantly positioned relatively to the bores in the rotator. Variation in a relative position to the bores, of the molded products captured by the bores may lead to defectiveness such as an erroneous inspection result of the molded products or failing to achieve perfect typing at an appropriate position.

SUMMARY OF THE INVENTION

It is an exemplary object of the present invention to provide a molded product conveying device preferably inhibiting variation in a relative position of a molded product being conveyed.

The invention exemplarily provides a molded product conveying device configured to suck a molded product to a rotator rotating about a predetermined rotary axis and convey the molded product along a rotation orbit. The conveying device includes a pocket disposed along an outer circumference of the rotator, recessed inward and opened outward radially and perpendicularly to the rotary axis, and fed therein with negative pressure to suck the molded product, and a suction bore positioned to confront the pocket at a first end or a second end along the rotary axis of the rotator, opened toward the pocket to be at least partially overlapped with the pocket when viewed along the rotary axis, and fed therein with negative pressure to suck the molded product. The molded product conveying device allows the molded product to be conveyed to be sucked to the pocket to constantly position the molded product relatively to the suction bore and suck the molded product to the suction bore for conveyance.

At a delivery position set as a predetermined position on a rotation orbit of the pocket and the suction bore, where the molded product is received and sucked, the pocket is preliminarily fed with negative pressure, the suction bore is not fed with negative pressure, and the molded product is initially sucked to the pocket, and after the pocket and the suction bore pass the delivery position, the suction bore starts being fed with negative pressure and the molded product sucked to the pocket is sucked to the suction bore. This configuration further reduces variation in a relative position of the molded product to the suction bore, in comparison to a case where the molded product is directly sucked to the suction bore at the delivery position.

When the conveying device including the plurality of rotators disposed adjacent to each other to have the rotary axes in parallel with each other, the molded product can be conveyed a longer distance. In this case, the rotators each include a basal portion having a substantially circular disc shape when viewed along the rotary axis, and a flange expanding radially outward from an outer circumferential edge of the basal portion. The basal portion includes the pocket disposed at an outer circumference, and the flange includes the suction bore positioned to confront the pocket. At a delivery position set as a predetermined position on a rotation orbit of the pocket and the suction bore, where the molded product is delivered between the adjacent rotators, the basal portion of the first rotator and the basal portion of the second rotator are substantially flush with each other, the flange of the first rotator and the flange of the second rotator face each other along the rotary axes, and the suction bore at the flange of the first rotator is overlapped with the suction bore at the flange of the second rotator when viewed along the rotary axes.

The rotator includes a basal portion having a substantially circular disc shape when viewed along the rotary axis, and a flange expanding radially outward from an outer circumferential edge of the basal portion, the basal portion has the pocket disposed at an outer circumference, the flange has the suction bore positioned to confront the pocket, the suction bore is a through hole penetrating the flange and having a closed peripheral edge, and is sized and shaped to have the peripheral edge located inside an outer edge of the molded product sucked to the suction bore when viewed along the rotary axis, and the conveying device is accompanied by an inspection device including a light source configured to irradiate the molded product sucked to the suction bore with light or an electromagnetic wave, and a light receiving element configured to receive light or an electromagnetic wave having transmitted through the molded product and having passed through the suction bore. This configuration allows only light or an electromagnetic wave having transmitted through the molded product to be incident on the light receiving element, and shields light or an electromagnetic wave not transmitting through the molded product but diffracted so as not to be incident on the light receiving element. This improves accuracy in inspection of the molded product with use of the inspection device.

The exemplary invention may achieve a molded product conveying device preferably inhibiting variation in a relative position of a molded product being conveyed.

BRIEF DESCRIPTION OF THE DRAWINGS

The exemplary aspects of the invention will be better understood from the following detailed description of the exemplary embodiments of the invention with reference to the drawings.

DETAILED DESCRIPTION OF AN EXEMPLARY EMBODIMENT

Figure 1:
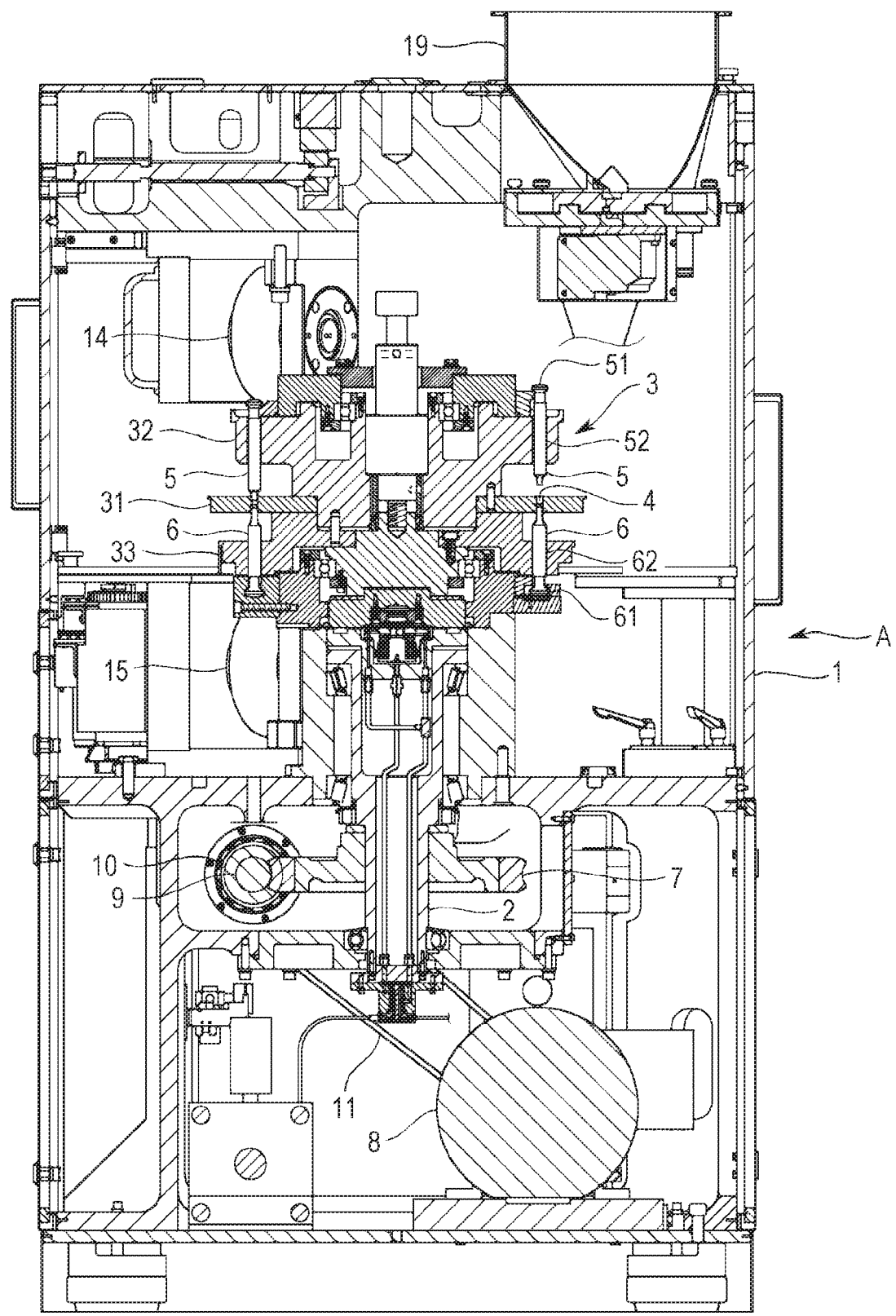
FIG. 1 is a side sectional view of a rotary compression-molding machine according to an exemplary embodiment of the exemplary invention.

An exemplary embodiment of the exemplary invention will now be described with reference to the drawings. Initially described is an overview of an entire rotary compression-molding machine (hereinafter, referred to as the "molding machine") A according to the exemplary embodiment. The molding machine A is configured to compress a powdery material to obtain a compression molded product P such as a pharmaceutical tablet. A powdery material is an aggregate of minute solids and conceptually includes an aggregate of particles such as so-called granules and an aggregate of powder smaller than such particles. As shown exemplarily in FIG. 1, the molding machine A includes a frame 1 accommodating an upright shaft 2 functioning as a rotary shaft and a turret 3 attached to a connection portion that is disposed at a top of the upright shaft 2.

The turret 3 horizontally rotates about the upright shaft 2, and more specifically, spins. The turret 3 includes a die table (e.g., die disc) 31, an upper punch retaining portion 32, and a lower punch retaining portion 33. As shown exemplarily in FIG. 2, the die table 31 has a substantially circular disc shape in a planar view in a vertical direction, and has a plurality of die bores 4 that is disposed in an outer circumferential portion and is aligned in a rotation direction (i.e., circumferential direction) at predetermined intervals. Each of the die bores 4 vertically penetrates the die table 31. The die table 31 is alternatively divided into a plurality of plates. Instead of the die bores 4 formed by directly drilling the die table 31, the die table 31 alternatively has a plurality of die members that is separate from the die table 31 and is detachably attached thereto. In this case, each of the die members has a die bore penetrating vertically.

The die bores 4 each have an upper punch 5 and a lower punch 6 disposed above and below the die bore 4, respectively. The upper punches 5 and the lower punches 6 are retained by the upper-punch retaining portion 32 and the lower punch retaining portion 33, respectively, so as to be independently slidable vertically with respect to a corresponding one of the die bores 4. The upper punches 5 each have a tip 53 that enters and exits the corresponding one of the die bores 4. The lower punches 6 each have a tip 63 that is kept inserted in the corresponding one of the die bores 4. The upper punches 5 and the lower punches 6 horizontally rotate, and more specifically revolve, about the upright shaft 2 along with the turret 3 and the die bores 4.

The upright shaft 2 has a lower end to which a worm wheel 7 is attached. The worm wheel 7 meshes with a worm gear 10. The worm gear 10 is fixed to a gear shaft 9 that is driven by a motor 8. Drive power outputted from the motor 8 is transmitted to the gear shaft 9 via a belt 11, so as to drive to rotate the upright shaft 2 by way of the worm gear 10 and the worm wheel 7, and further to rotate the turret 3 and the punches 5 and 6.

Figure 2:
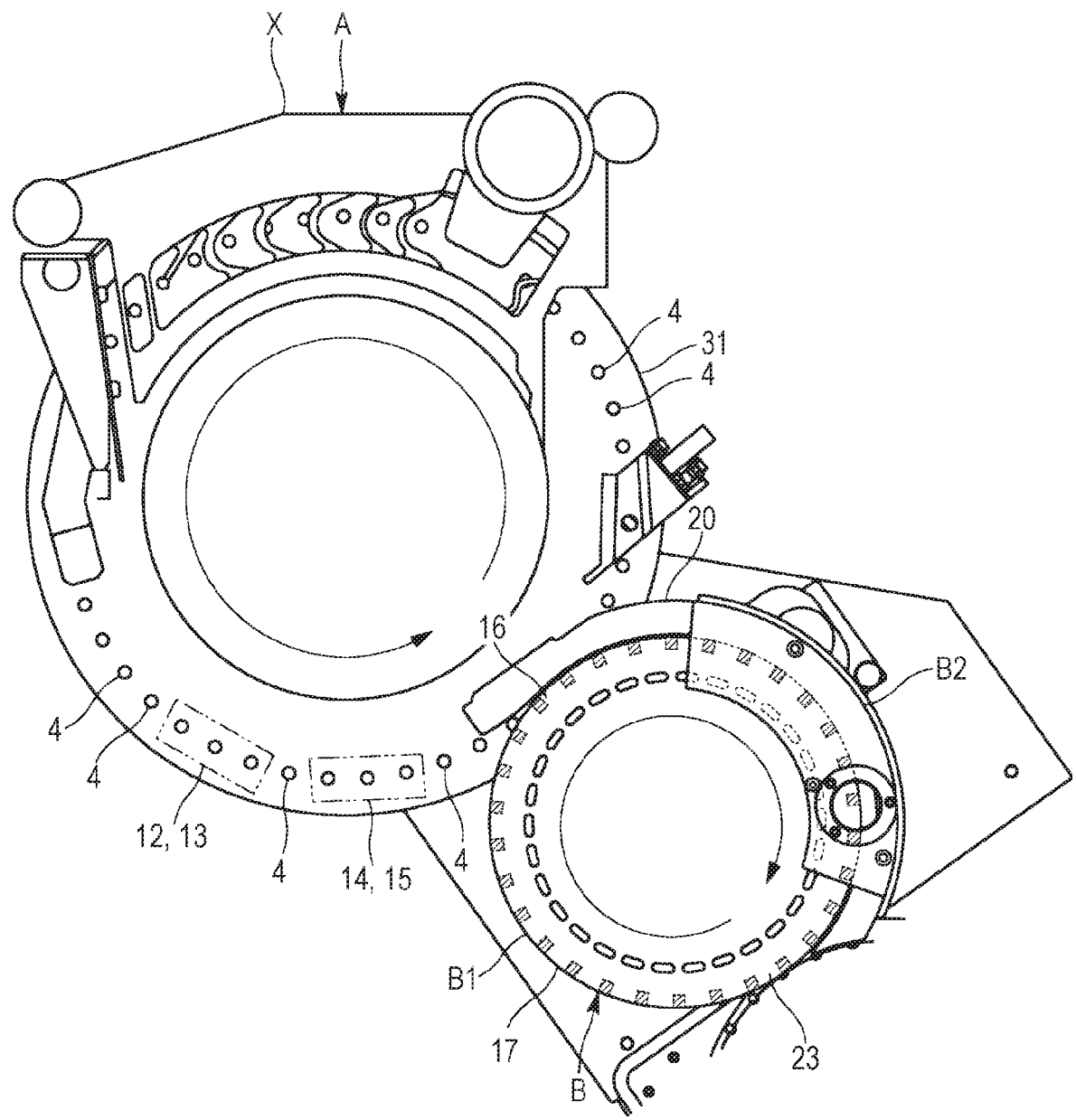
FIG. 2 is a plan view of a main part of the rotary compression-molding machine and a molded product discharge device according to the exemplary embodiment.

The powdery material as a constituent material for molded products P is filled in the die bores 4 with use of a feeder X, as shown in FIG. 2. Examples of the feeder X include an agitated feeder and a gravity feeder, either one of which is applicable to the exemplary invention. The powdery material is fed to the feeder X with use of a powdery material feeding device. The powdery material is fed to the powdery material feeding device with use of a hopper 19. The hopper 19 is detachably attached to the molding machine A.

Figure 3:
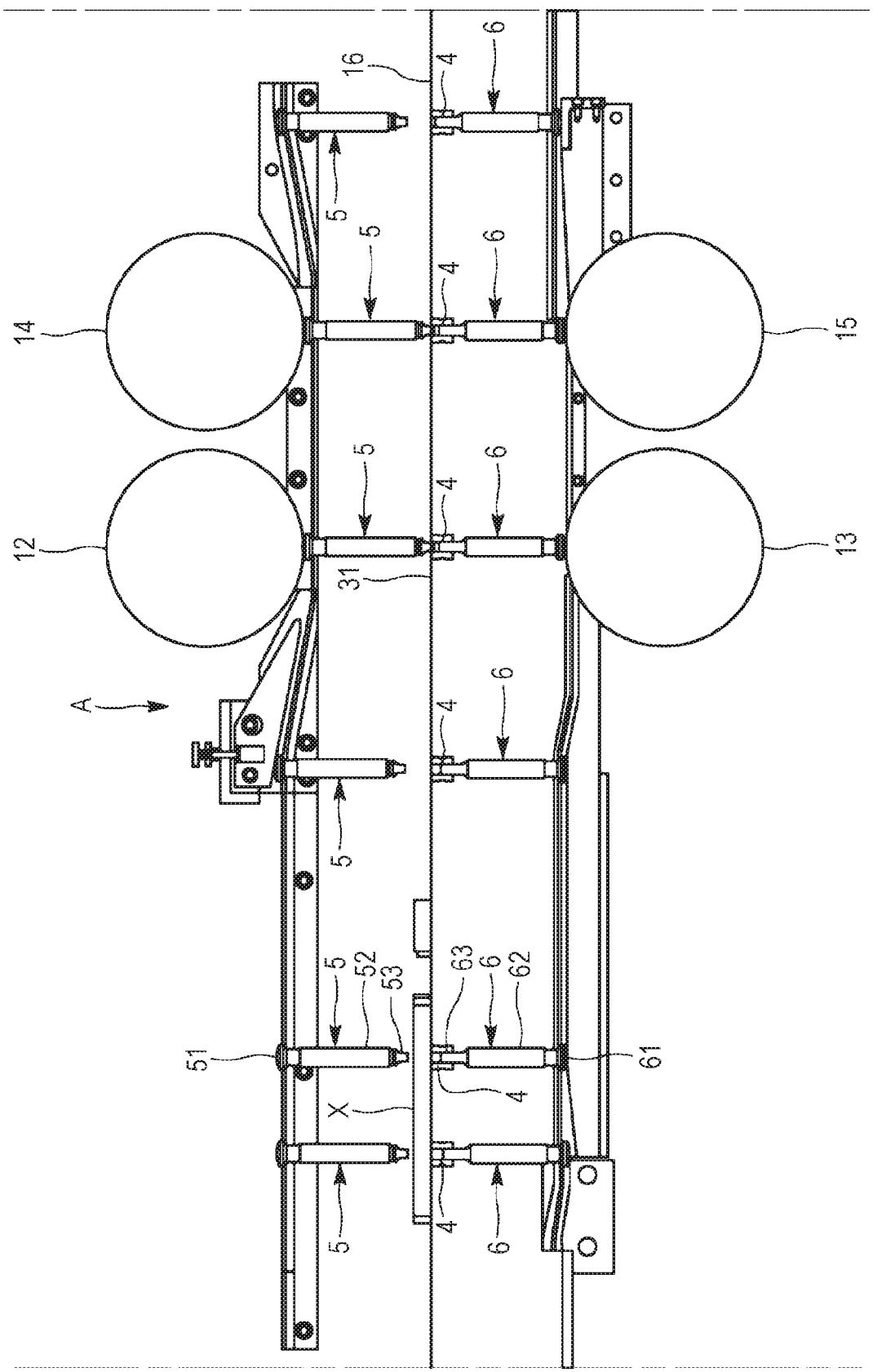
FIG. 3 is a cylindrical view of the rotary compression-molding machine according to the exemplary embodiment.
Figure 4:
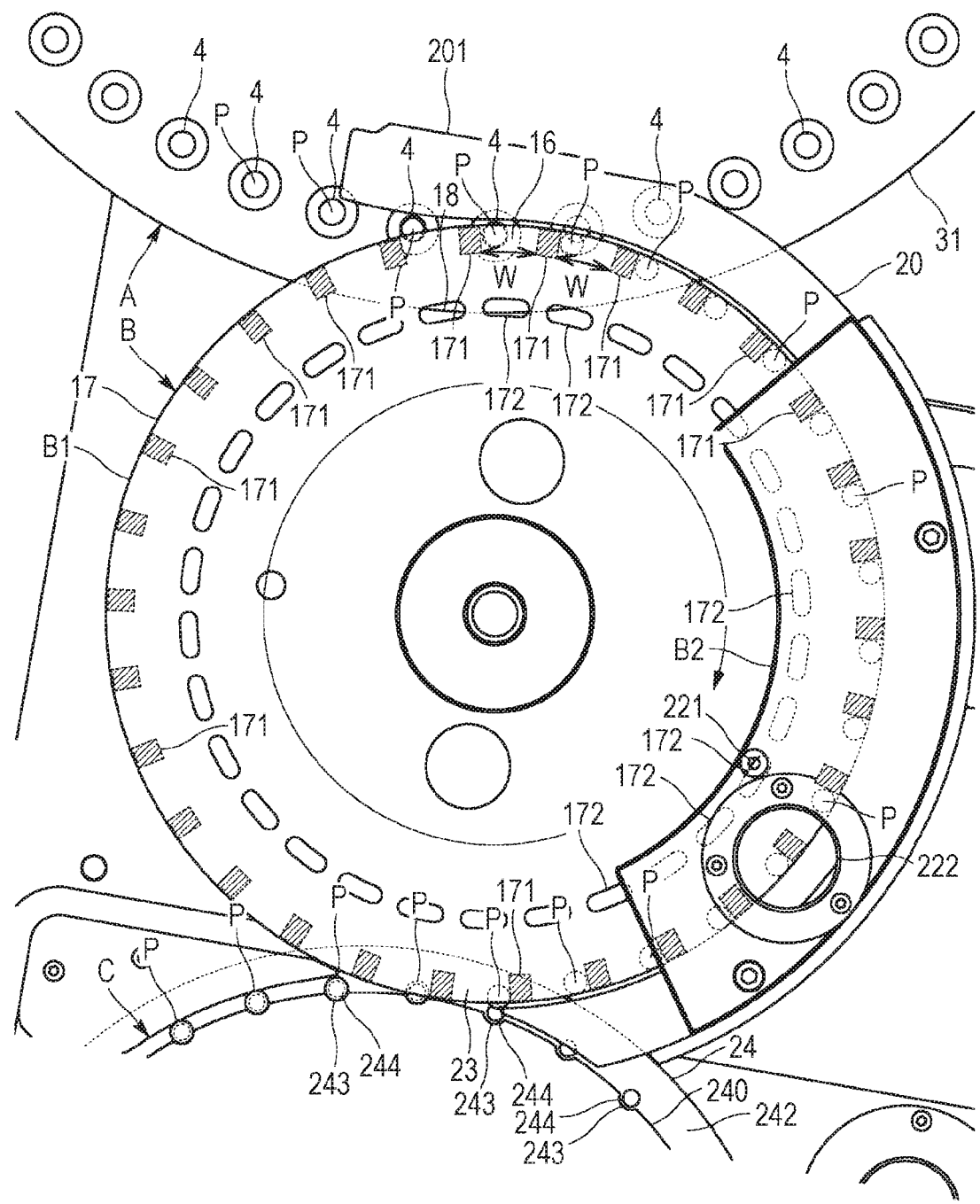
FIG. 4 is a plan view of a main part of the molded product discharge device according to the exemplary embodiment.

As shown exemplarily in FIGS. 2 and 3, a preliminary compression upper roll 12, a preliminary compression lower roll 13, a substantial compression upper roll 14, and a substantial compression lower roll 15 are disposed on orbits of the punches 5 and 6 that revolve about the upright shaft 2. The preliminary compression upper roll 12 and the preliminary compression lower roll 13 are paired to vertically sandwich the punches 5 and 6, and the substantial compression upper roll 14 and the substantial compression lower roll 15 are paired to vertically sandwich the punches 5 and 6, respectively. The preliminary compression upper roll 12 and the preliminary compression lower roll 13 as well as the substantial compression upper roll 14 and the substantial compression lower roll 15 bias the upper and lower punches 5 and 6 to bring the upper and lower punches 5 and 6 closer to each other, so that distal end surfaces of the tips 53 and 63 compress from above and below the powdery material filled in the die bores 4.

The upper and lower punches 5 and 6 have heads 51 and 61, respectively, pressed by the rolls 12, 13, 14, and 15, and trunks 52 and 62 smaller in diameter than the heads 51 and 61. The upper punch retaining portion 32 of the turret 3 vertically slidably retains the trunks 52 of the upper punches 5, whereas the lower punch retaining portion 33 vertically slidably retains the trunks 62 of the lower punches 6. The tips 53 and 63 as distal ends of the trunks 52 and 62 are thinner than the remaining parts and have diameters substantially equal to an inner diameter of the die bores 4 so as to be inserted to the die bores 4. The punches 5 and 6 revolve to cause the rolls 12, 13, 14, and 15 to come closer to the heads 51 and 61 of the punches 5 and 6, respectively. The rolls 12, 13, 14, and 15 come into contact with the heads 51 and 61 to step thereonto. The rolls 12, 13, 14, and 15 further press the upper punches 5 downward and press the lower punches 6 upward. While the rolls 12, 13, 14, and 15 are in contact with flat surfaces of the punches 5 and 6, the punches 5 and 6 keep applying constant pressure to the powdery material in the corresponding die bores 4.

There is a delivery position 16 for the molded products P, displaced ahead, in a rotation direction of the turret 3 and the punches 5 and 6, from a position pressed by the substantial compression upper roll 14 and the substantial compression lower roll 15. Each of the lower punches 6 ascends until an upper end surface of the tip 63 of the lower punch 6 becomes substantially flush with an upper end of the die bore 4, or an upper surface of the die table 31 before reaching the delivery position 16, and pushes the molded product P out of the die bore 4. The molded product P pushed out of the die bore 4 is transferred to a molded product processing system (hereinafter, referred to as the "processing system") S connected to the molding machine A at the delivery position 16.

The molding machine A and (modules B, C, and D of) the processing system S according to the exemplary embodiment are controlled by a controller examples of which include a microcomputer system, a personal computer, and a work station each including a processor, a main memory and an auxiliary storage device (e.g., a flash memory or a hard disk drive) as storage devices, an input/output interface, and the like, and a programmable controller. The controller reads a program preliminarily stored in the auxiliary storage device to the processor via the memory, causes the processor to decode the program, and controls the molding machine A and the processing system S.

As shown exemplarily in FIGS. 2, 4, 8, and 12, the processing system S accompanying the molding machine A in the exemplary embodiment includes the plurality of disposed modules B, C, and D, each configured to apply a certain post process to the molded products P.

The module B, located downstream of and directly connected to the molding machine A, includes a discharge device B1 configured to sequentially discharge the molded products P from the molding machine A such that the molded products P are kept aligned in the order of molding by the molding machine A. The discharge device B1 is configured to discharge the molded products P at the delivery position 16 and convey the molded products P toward a processing device B2 configured to apply a subsequent process to the molded products P.

As shown exemplarily in FIGS. 2 and 4 to 7, the discharge device B1 includes, as main constituent elements, a rotator 17 configured to horizontally rotate about a vertical axis in synchronization with the turret 3 and the die table 31 of the molding machine A, a retainer 18 disposed vertically below the rotator 17 and facing the rotator 17, a plurality of projections 171 extending downward toward the retainer 18 from a lower surface facing the retainer 18 in an outer circumferential portion of the rotator 17, an outer guide 20 disposed adjacent to the outer circumferential portion of the rotator 17 and closing, from outside, gaps between the adjacent projections 171, and an inner guide 21 disposed inside the outer circumferential portion of the rotator 17 and closing, from inside, the gaps between the adjacent projections 171.

The rotator 17 rotates clockwise in the figures relatively to the die table 31 that rotates counterclockwise in the figures. In order to synchronize a rotation between the die table 31 and the rotator 17, the rotator 17 can be rotated by a motor configured as a servo motor or a stepping motor, and angular position sensors, such as rotary encoders, can detect a rotation angle and a rotational speed of each of the turret 3 and the rotator 17, to enable a feedback control of a rotational speed of the motor for a synchronized rotation between the turret 3 and the rotator 17. The turret 3 and the rotator 17 are alternatively mechanically connected to interlock via a gear transmission mechanism, a winding transmission mechanism, or the like.

The rotator 17 has a substantially circular disc shape in a planar view along a rotary axis of the rotator 17 (i.e., in the vertical direction). The plurality of projections 171 at the rotator 17 is disposed along an outer circumferential edge of the rotator 17 circumferentially around the rotary axis of the rotator 17, to be spaced apart from each other at predetermined intervals. These projections 171 obviously rotate integrally with the rotator 17. The molded products P by the molding machine A are each captured between the adjacent projections 171 of the rotator 17 to be transferred while being accommodated in the gap between the adjacent projections 171.

The gaps between the projections 171 circumferentially adjacent to each other have a width W larger than the largest external size of the molded product P by the molding machine A. The largest external size corresponds to the longest one of line segments in a planar view, each extending from a certain point on an outer edge (i.e., outline) of the molded product P to a different point on the outer edge of the molded product P through a gravity center or a geometrical center of the molded product P. In a case where the molded product P has an elliptical shape in a planar view, the largest external size corresponds to a major axis or a long diameter.

Figure 5:
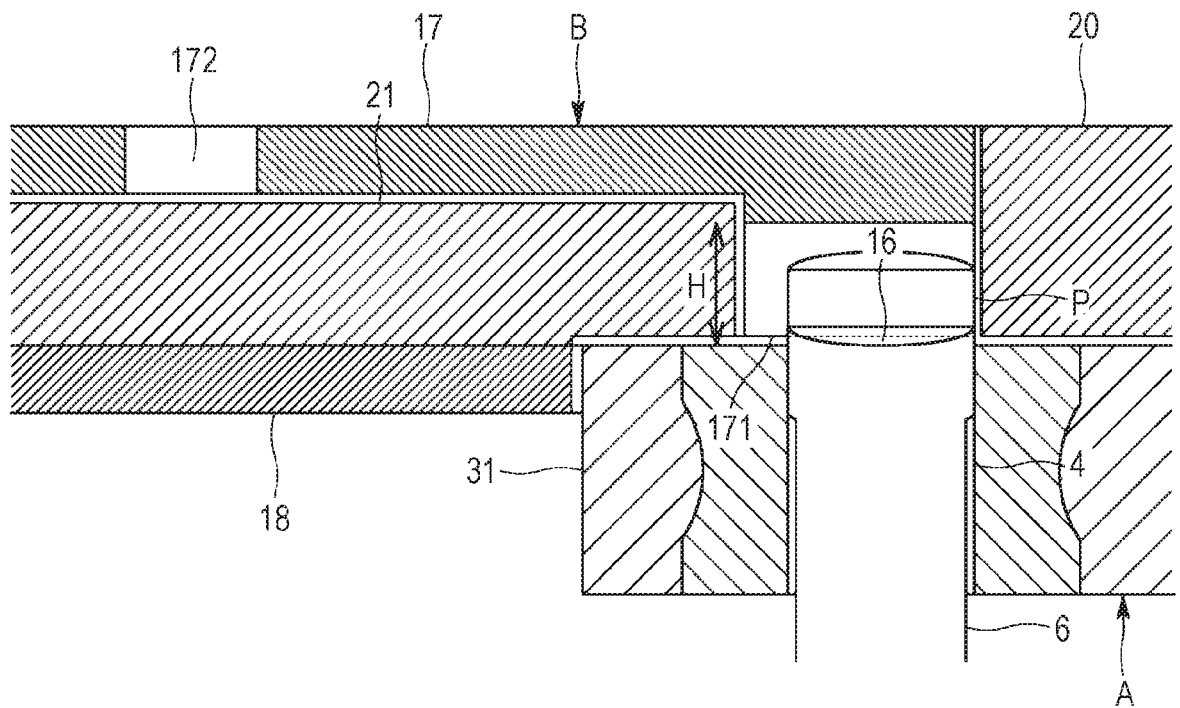
FIG. 5 is a longitudinal sectional view of a main part of the molded product discharge device according to the exemplary embodiment.
Figure 6:
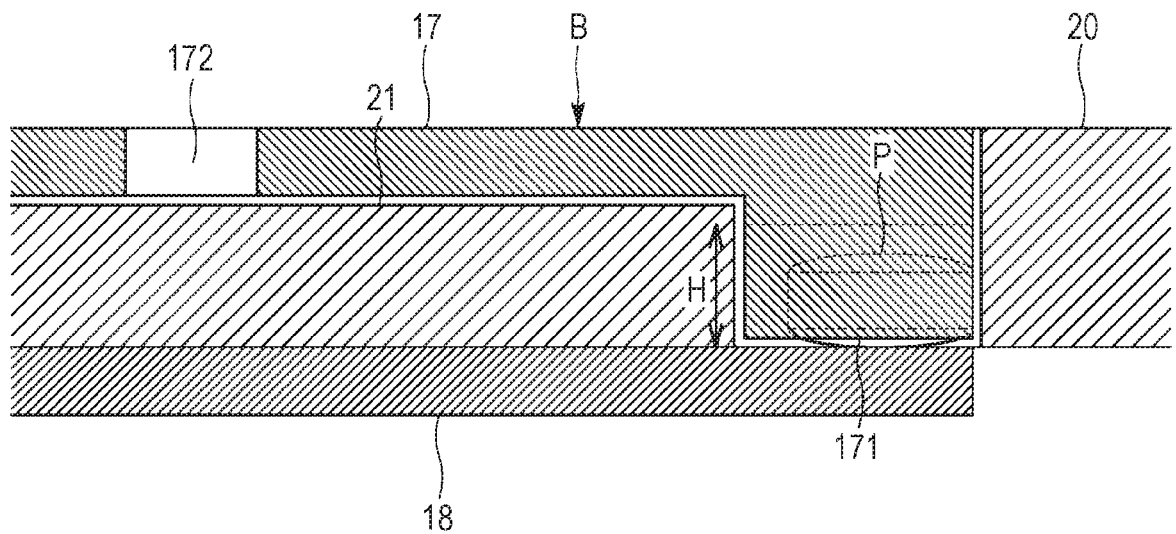
FIG. 6 is a longitudinal sectional view of a main part of the molded product discharge device according to the exemplary embodiment.

As shown exemplarily in FIG. 5, the lower surface of the rotator 17 faces an upper surface of the retainer 18 with a predetermined vertical distance therebetween. The lower surface of the rotator 17 is positioned higher than the upper surface of the die table 31 of the molding machine A. The outer circumferential portion of the rotator 17 partially overlaps the die table 31 of the molding machine A from above. The projections 171 extending from the lower surface of the rotator 17 each have a distal end immediately adjacent to the upper surface of the retainer 18 and the upper surface of the die table 31. Synchronous rotation of the die table 31 and the rotator 17 temporarily overlaps each of the die bores 4 and the gap between the adjacent projections 171 at the delivery position 16 for the molded products P.

Unlike the rotator 17, the retainer 18 does not rotate and is disposed to overlap the outer circumferential portion of the rotator 17 from below. The retainer 18 is disposed adjacent to the die table 31 of the molding machine A and has the upper surface substantially flush with the upper surface of the die table 31. The molded product captured in the gap between the adjacent projections 171 of the rotator 17 slides or rolls on the upper surface of the retainer 18 while being horizontally rotating along with the projections 171. In other words, the retainer 18 supports the transferred molded product from below. In order to prevent interference with the die table 31, the retainer 18 has a part that corresponds to the delivery position 16, where the die table 31 and the rotator 17 overlap each other in a planar view, and is cut away in an arc shape along an outer circumferential edge of the die table 31. The part of the retainer 18 has an edge immediately adjacent to the outer circumferential edge of the die table 31 and allows the molded product P to smoothly shift from the upper surface of the die table 31 of the molding machine A onto the upper surface of the retainer 18 of the discharge device B1.

The lower surface of the rotator 17 and the upper surface of the retainer 18 have a clearance H therebetween, which is substantially equal to or larger than vertical thickness of the molded product P by the molding machine A and is smaller than the smallest external size of the molded product P. The smallest external size corresponds to the shortest one of line segments in a planar view, each extending from a certain point on the outer edge of the molded product P to a different point on the outer edge of the molded product P through the gravity center or the geometrical center of the molded product P. In the case where the molded product P has an elliptical shape in a planar view, the smallest external size corresponds to a minor axis or a short diameter. The thickness of the molded product P is substantially equal to a vertical distance between the tip 53 of the upper punch 5 and the tip 63 of the lower punch 6 upon completion of compressing the powdery material filled in the die bore 4 in the molding machine A.

The outer guide 20 is disposed adjacent to the outer circumferential edge of the rotator 17 and expands to have a substantially arc shape surrounding the rotator 17 in a planar view. The guide 20 closes, from outside, the gaps positioned between the adjacent projections 171 and opened radially outward and perpendicularly to the rotary axis of the rotator 17, to inhibit the molded products P from coming outward from the gaps due to centrifugal force. The outer guide 20 has a start edge 201 projecting toward the die table 31 of the molding machine A and overlapping the die table 31 from above to be positioned vertically above a horizontal rotation locus of the die bores 4. The start edge 201 serves as a guide member configured to catch, at the delivery position 16, the molded products P pushed to the upper surface of the die table 31 and to deliver the molded products P to the discharge device B1.

The inner guide 21 is disposed adjacent to radially inner edges of the projections 171 of the rotator 17, and expands to have, in a planar view, a substantially arc shape located inside the outer circumferential portion of the rotator 17. The guide 21 closes, from inside, the gaps opened radially inward on the rotator 17, to inhibit an unintended inward displacement of the molded products. The inner guide 21 is fixed to the retainer 18 or may be formed integrally with the retainer 18. The rotator 17 has a part facing an upper surface of the inner guide 21 and having a lower surface slightly recessed upward from lower surfaces facing the gaps (i.e., portions not having the projections 171) in the outer circumferential portion of the rotator 17. The upper surface of the inner guide 21 excluding an area equipped with a dust removal device B2 to be described later is positioned slightly higher than the lower surfaces facing the gaps in the outer circumferential portion of the rotator 17. This prevents the molded products P from entering a space between the lower surface of the rotator 17 and the upper surface of the inner guide 21.

As described earlier, each of the lower punches 6 in the molding machine A ascends to push the molded product P out of the die bore 4 before the die bore 4 containing the molded product P reaches the delivery position 16. The molded product P having been pushed out comes into contact with the outer guide 20 at the delivery position 16 due to a rotation of the die table 31, and travels along the outer guide 20. The molded product P on the die table 31 then shifts onto the retainer 18. The molded product P is captured by the projections 171 extending downward from the rotator 17 and enters the gap between the adjacent projections 171 in a region between the rotator 17 and the retainer 18. The molded products P are each accommodated in one of the gaps. Thus, the gaps accommodate the molded products P one by one in the order of alignment of the die bores 4 in the die table 31 of the molding machine A (i.e., keeping the order of compression molding by the molding machine A). Furthermore, the molded products P will not be reversed vertically while being delivered from the die table 31 of the molding machine A to the rotator 17 of the discharge device B1 in the module B.

Each of the molded products P captured in the gap between the adjacent projections 171 comes into contact with the projection 171 positioned behind in a rotation direction of the rotator 17 and is pushed by the projection 171 to slide or roll to be transferred on the retainer 18 along a rotation locus of the projection 171. Each of the molded products P accommodated in the gap is substantially constantly positioned relatively to the adjacent projections 171. The molded product P is displaced in the gap radially outward from a radially inner position on the rotator 17 because the rotating rotator 17 applies centrifugal force to the molded product P. The molded product P, however, comes into contact with an inner rim of the outer guide 20 to be prevented from being further displaced, so that the molded product P will not come outward from the gap. The rotator 17 closes the gaps from above, so that the molded product P captured in the gap will not suddenly bounce and come out of the gap.

The molded product P captured between the adjacent projections 171 of the rotator 17 is transferred to a delivery position 23 as a transfer end position. The retainer 18 has a part that corresponds to the delivery position 23 and is cut away in an arc shape along an outer circumferential edge of a rotator 24 of a conveying device C1, to be described later, for prevention of interference with the rotator 24. The outer circumferential portion of the rotator 17 and the retainer 18 do not overlap each other in a planar view at the delivery position 23. The molded products P having reached the delivery position 23 are not supported by the retainer 18 from below and drop out of the gaps between the adjacent projections 171 to be delivered to the conveying device C1 in the module C located downstream of and directly connected to the module B while keeping the order of alignment.

The dust removal device B2, configured to remove dust adhering to the molded products P, is disposed partially in a conveyance section of the molded products P from the delivery position 16 to the delivery position 23 in the outer circumferential portion of the rotator 17, as a processing device included in the module B.

The rotator 17 has preliminarily formed communicating bores 172 each causing a corresponding one of the gaps between the adjacent projections 171 to be communicable with outside. The communicating bores 172 are positioned radially inside the gaps of the rotator 17 and vertically penetrate the rotator 17 as long bores extending circumferentially in the rotator 17. The communicating bores 172 are equal in the number to the gaps. The dust removal device B2 covers, from above, the communicating bores 172, the gaps between the adjacent projections 171, and a boundary between the rotator 17 and the outer guide 20, and expands circumferentially along the rotator 17.

Figure 7:
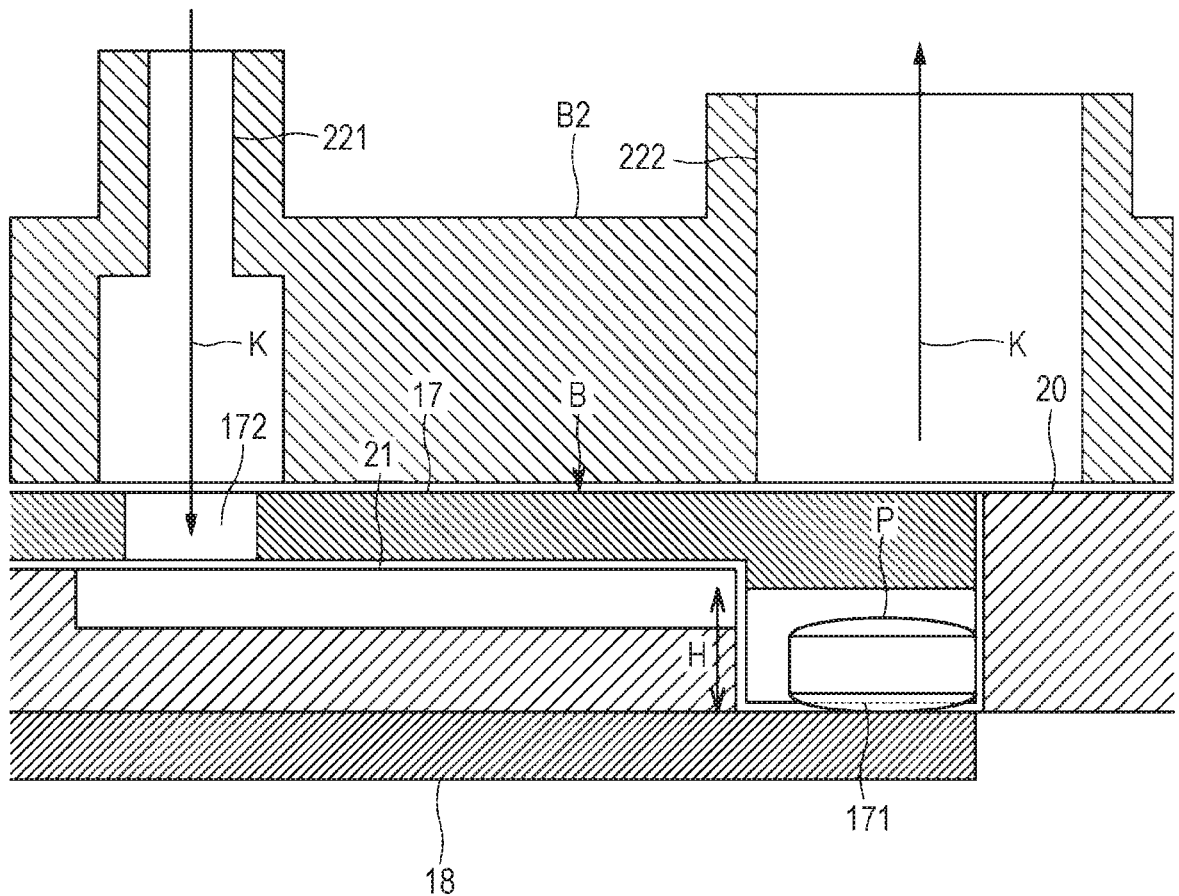
FIG. 7 is a longitudinal sectional view of main parts of the molded product discharge device and a dust removal device according to the exemplary embodiment.
Figure 8:
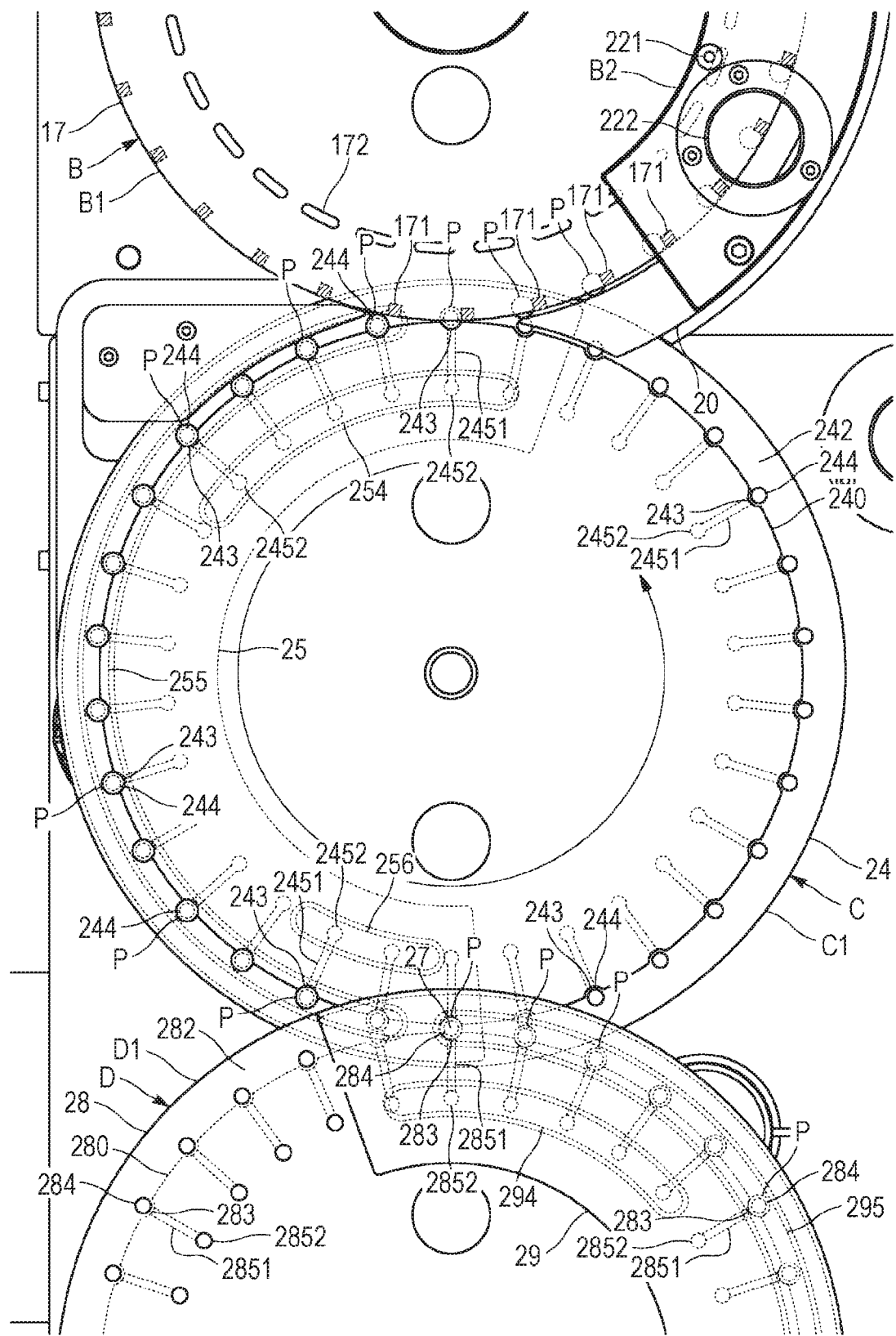
FIG. 8 is a plan view of a main part of a molded product conveying device according to the exemplary embodiment.

As shown exemplarily in FIG. 7, the dust removal device B2 includes a spray nozzle 221 positioned vertically above the communicating bore 172 and configured to spray compressed air K fed from a pump (not shown), downward toward the communicating bore 172, and a dust collecting port 222 positioned vertically above the boundary between the rotator 17 and the outer guide 20 and configured to suck the air K upward with use of a pump (not shown). The compressed air K can be preliminarily ionized by a static eliminator, and can be sprayed in a pulsed manner. The compressed air K fed from the spray nozzle 221 reaches the gap between the adjacent projections 171 through the space between the lower surface of the rotator 17 and the upper surface of the inner guide 21, and is sprayed to an exterior of the molded product P accommodated in the gap to blow off and to remove dust adhering to the exterior of the molded product P. The air K having hit the molded product P and containing dust leaks upward through a space between the rotator 17 and the outer guide 20 and is sucked to the dust collecting port 222.

The conveying device C1 in the module C connected behind the module B receives the molded products P from the discharge device B1 at the delivery position 23 for the molded products P, and conveys the molded products P to processing devices C2 and C3 each configured to apply a subsequent process to the molded products P. The molded products P are kept aligned in the order of molding by the molding machine A also when the molded products P are delivered from the discharge device B1 to the conveying device C1. As shown exemplarily in FIGS. 8 to 11, the conveying device C1 mainly includes the rotator 24 configured to horizontally rotate about a vertical axis in synchronization with the rotator 17 of the discharge device B1.

The rotator 24 rotates counterclockwise in the figures relatively to the rotator 17 that rotates clockwise in the figures. In order to synchronize rotation between the rotator 17 and the rotator 24, the rotator 24 can be rotated by a motor configured as a servo motor or a stepping motor, and angular position sensors such as rotary encoders can detect a rotation angle and rotational speed of each of the rotator 17 and the rotator 24, to enable feedback control of rotational speed of the motor for synchronized rotation between the rotator 17 and the rotator 24. The rotator 17 and the rotator 24 are alternatively mechanically connected to interlock via a gear transmission mechanism, a winding transmission mechanism, or the like.

The rotator 24 has a substantially circular disc shape in a planar view along a rotary axis of the rotator 24 (i.e., in the vertical direction). More specifically, the rotator 24 includes two circular disc plates 240 and 241 sized differently in outer diameter such that the circular disc plate 240 having a smaller outer diameter is overlapped on the circular disc plate 241 having a larger outer diameter to be firmly coupled with each other and be integrated. The lower circular disc plate 241 has an outer circumferential portion 242 that accordingly expands radially outward and perpendicularly to the rotary axis of the rotator 24, from a basal portion of the rotator 24 (i.e., an outer circumferential edge of the upper circular disc plate 240). The outer circumferential portion 242 serves as a flange of the rotator 24.

The basal portion 240 of the rotator 24 has an outer circumferential surface including pockets 243 that are recessed radially inward and are opened radially outward. The outer circumferential edge of the basal portion 240 has a substantially circular shape and is recessed to come closer to the rotary axis of the rotator 24 only at the pockets 243. The flange 242 includes suction bores 244 positioned to confront the pockets 243 at first ends along the rotary axis (i.e., confront from below, and each having a closed peripheral edge). When the rotator 24 is viewed vertically, each of the suction bores 244 is at least partially overlapped with a corresponding one of the pockets 243 and is opened upward toward the pocket 243. The suction bores 244 each have an inner peripheral edge extending along an inner wall surface of the pocket 243 in a planar view. Each of the suction bores 244 vertically penetrates the flange 242.

The pockets 243 and the suction bores 244 are disposed along the outer end of the rotator 24 circumferentially around the rotary axis of the rotator 24, to be spaced apart from each other at predetermined intervals. These pockets 243 and the suction bores 244 obviously rotate integrally with the rotator 24. Each of the molded products P delivered from the discharge device B1 in the module B to the conveying device C1 in the module C is transferred while being engaged with the pocket 243 and the suction bore 244 of the rotator 24 and captured by the suction bore 244.

Figure 9:
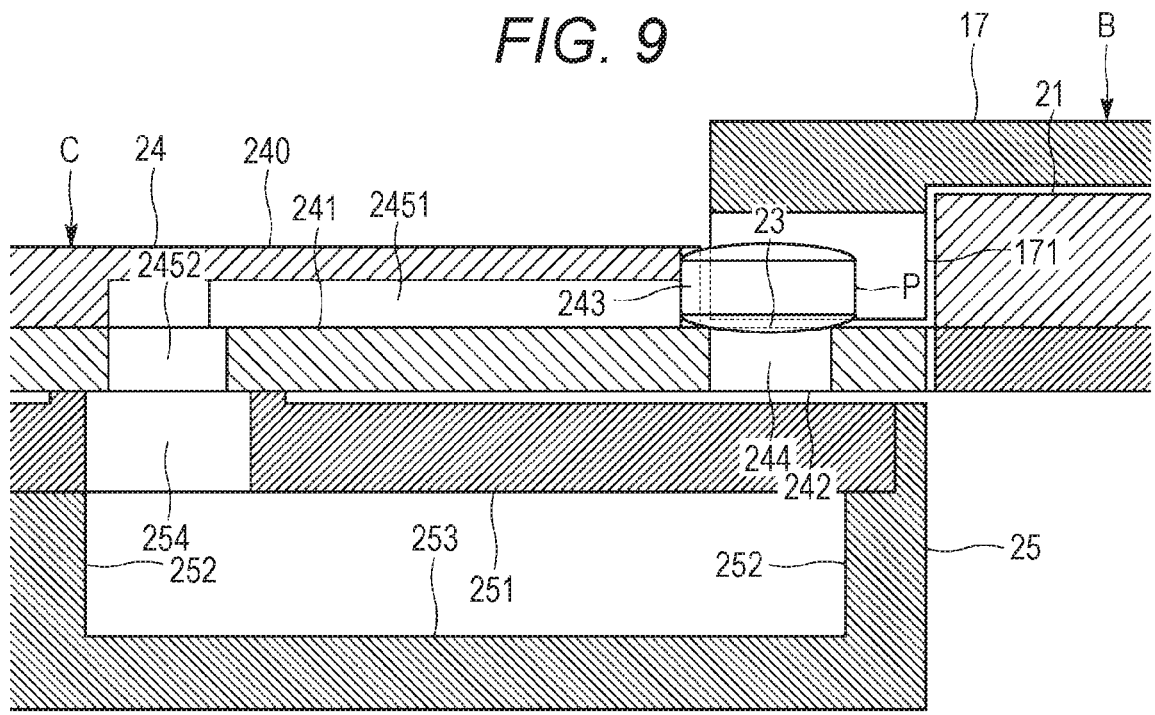
FIG. 9 is a longitudinal sectional view of a main part of the molded product conveying device according to the exemplary embodiment.

As shown exemplarily in FIG. 9, in the outer circumferential portion of the rotator 24 in the conveying device C1, the flange 242 has an upper surface that is positioned below the lower surface of the rotator 17 and is substantially flush with the upper surface of the retainer 18 in the discharge device B1 in the module B. The outer circumference and the pockets 243 in the basal portion 240 of the rotator 24 are substantially flush with the gaps between the adjacent projections 171 of the rotator 17 to horizontally face the gaps. Furthermore, the flange 242 of the rotator 24 partially overlaps the rotator 17 from below in a planar view, to vertically face the rotator 17. The distal ends of the projections 171 extending from the lower surface of the rotator 17 are immediately adjacent to the upper surface of the retainer 18 and the upper surface of the flange 242. Synchronous rotation between the rotator 17 and the rotator 24 causes each of the gaps between the adjacent projections 171 and a corresponding one of the suction bores 244 to temporarily overlap each other at the delivery position 23.

In order to prevent interference with the flange 242 of the rotator 24, the part of the retainer 18, corresponding to the delivery position 23 where the flange 242 and the rotator 17 overlap each other in a planar view, is cut away in an arc shape along an outer circumferential edge of the flange 242. The part of the retainer 18 has an edge immediately adjacent to the outer circumferential edge of the flange 242 and allows the molded product P to smoothly shift from the upper surface of the retainer 18 in the discharge device B1 to the upper surface of the flange 242 of the rotator 24 in the conveying device C1.

At the delivery position 23, the molded product P accommodated in the gap between the adjacent projections 171 of the rotator 17 and having been transferred by being pushed by the projection 171 shifts from on the retainer 18 onto the flange 242 of the rotator 24 due to rotation of the rotator 17. The molded product P enters the pocket 243 in the rotator 24 and is captured by the suction bore 244. The molded products P are each accommodated in one of the suction bores 244. The suction bores 244 thus engage with the molded products P one by one in the order of alignment of the gaps between the adjacent projections 171 of the rotator 17 in the discharge device B1 (i.e., keeping the order of compression molding by the molding machine A). The molded products P will not be reversed vertically while being delivered from the rotator 17 of the discharge device B1 to the rotator 24 of the conveying device C1.

The molded products P, captured by the suction bores 244, are transferred along a rotation locus of the suction bores 244 due to rotation of the rotator 24. Each of the molded products P accommodated in the suction bore 244 is substantially constantly positioned relatively to the rotator 24 and the suction bore 244. The molded product P receives a centrifugal force due to a rotation of the rotator 24, but is sucked to the suction bore 244 so as not to be displaced outward. Furthermore, the molded products P will not be reversed vertically in the transfer process.

The molded product P, captured by the suction bore 244, is eventually transferred to a delivery position 27 as a transfer end position. The molded product P having reached the delivery position 27 is delivered from the conveying device C1 in the module C to a conveying device D1 included in the module D located downstream of and directly connected to the module C.

Described below is a mechanism configured to suck the molded products P to the pockets 243 and the suction bores 244 of the rotator 24. The pockets 243 and the suction bores 244 each have negative pressure, to suck the molded product P to the pocket 243 and the suction bore 244. As shown exemplarily in FIGS. 8 to 11, the rotator 24 preliminarily includes suction passages 2451 and 2452 configured to feed the pockets 243 with negative pressure. The suction passages 2451 and 2452 include an inner passage 2451 having a start portion opened at an innermost position in the inner wall surface of each of the pockets 243, formed inside the rotator 24, and extending inward toward the rotary axis of the rotator 24, and a suction port 2452 formed by drilling upward from a lower surface of the rotator 24 to an end portion of the inner passage 2451 to allow the inner passage 2451 to communicate with the lower surface of the rotator 24. Specifically, the inner passage 2451 is a groove disposed in a lower surface of the upper circular disc plate 240 as the basal portion of the rotator 24 and opened downward. The groove 2451 is closed from below, by the circular disc plate 241 joined to the lower surface of the circular disc plate 240. The suction port 2452 is a through hole vertically penetrating a part of the lower circular disc plate 241, positioned vertically below the end portion of the inner passage 2451. The suction passages 2451 and 2452 allow each of the pockets 243 to communicate with the position of the suction port 2452 displaced inward from the pocket 243 in the lower surface of the rotator 24. The numbers of the suction passages 2451 and 2452 are equal to the number of pairs of the pockets 243 and the suction bores 244.

Atmospheres in the inner passages 2451 and the pockets 243 can be sucked via the suction ports 2452 to feed the pockets 243 with negative pressure. The rotator 24 is equipped therebelow with a negative pressure feeding duct 25 that extends along the outer circumference of the rotator 24 in a planar view to have a semi-arc shape. The duct 25 has a tubular body surrounding its internal space with a top wall 251 immediately close to the lower surface of the rotator 24, side walls 252 vertically extending downward from an inner side end and an outer side end of the top wall 251, and a bottom wall 253 connecting lower ends of the side walls 252. The internal space of the duct 25 is sucked by a pump (not shown) to have negative pressure.

The top wall 251 of the duct 25 has two slots 254 and 256 each of which is positioned vertically below the suction ports 2452 and has a partial arc shape around the rotary axis of the rotator 24 in a planar view. The slots 254 and 256 vertically penetrate the top wall 251. The slots 254 and 256 extend along a travel locus of the suction ports 2452 according to a rotation of the rotator 24. The former slot 254 extends along a rotation of the rotator 24 in a range from a position upstream of the delivery position 23 for the molded products P from the discharge device B1, to a predetermined position downstream of the delivery position 23. The latter slot 256 extends along rotation of the rotator 24 in a range from a position upstream of the delivery position 27 for the molded products P to the conveying device D1, to a position just before the delivery position 27.

Each of the pockets 243 is fed with negative pressure or is sucked only while the suction port 2452 in the suction passages 2451 and 2452 connected to the pocket 243 is positioned vertically above either one of the slots 254 and 256 (i.e., while the internal space having negative pressure in the duct 25 communicates with the pocket 243). When the suction port 2452 is not positioned vertically above the slot 254 or 256, the top wall 251 is located between the internal space of the duct 25 and the suction port 2452 to isolate the internal space of the duct 25 from the pocket 243 and prevent suction of the pocket 243.

The duct 25 also functions to feed the suction bores 244 with negative pressure. The top wall 251 of the duct 25 includes a slot 255 that is positioned vertically below the suction bores 244 and has a partial arc shape around the rotary axis of the rotator 24 in a planar view. The slot 255 also vertically penetrates the top wall 251. The slot 255 extends along a travel locus of the suction bores 244 according to a rotation of the rotator 24. The slot 255 extends along the rotation of the rotator 24 in a range from a position just after the delivery position 23 for the molded products P from the discharge device B1, to a position just before the delivery position 27 for the molded products P to the conveying device D1.

Each of the suction bores 244 is fed with negative pressure or is sucked only while the suction bore 244 is positioned vertically above the slot 255 (i.e., while the internal space having negative pressure in the duct 25 communicates with the suction bore 244). When the suction bore 244 is not positioned vertically above the slot 255, the top wall 251 isolates the internal space of the duct 25 from the suction bore 244 to prevent suction of the suction bore 244.

In a process of delivering the molded product P captured in the gap between the adjacent projections 171 of the rotator 17 in the discharge device B1 to a corresponding pair of the pocket 243 and the suction bore 244 of the rotator 24 in the conveying device C1, the pair of the pocket 243 and the suction bore 244 positioned upstream of the delivery position 23 and not retaining the molded product P initially moves toward the delivery position 23. When the pair of the pocket 243 and the suction bore 244 reach a position just before the delivery position 23, the suction port 2452 connected to the pocket 243 via the inner passage 2451 reaches vertically above the slot 254 and the negative pressure feeding duct 25 starts sucking the pocket 243. The suction bore 244 paired with the pocket 243 has not yet reached vertically above the slot 255 at this point, so that the suction bore 244 is not sucked.

In the pair of the pocket 243 and the suction bore 244 having reached the delivery position 23 for the molded products P, the pocket 243 is sucked but the suction bore 244 is not sucked. The molded product P captured in the gap between the adjacent projections 171 of the rotator 17 and having reached the delivery position 23 is sucked inward to come closer to the rotary axis of the rotator 24 toward the pocket 243 to be engaged with the pocket 243. The molded product P is thus constantly positioned relatively to the suction bore 244.

When the pocket 243 sucking the molded product P and the suction bore 244 paired with the pocket 243 move downstream from the delivery position 23, the suction bore 244 reaches vertically above the slot 255 and the negative pressure feeding duct 25 starts sucking the suction bore 244. The molded product P sucked to the pocket 243 is accordingly sucked also to the suction bore 244. The suction port 2452 connected to the pocket 243 via the inner passage 2451 is still positioned vertically above the slot 254 at this point, and both the pocket 243 and the suction bore 244 are fed with negative pressure.

When the rotator 24 rotates and the pocket 243 and the suction bore 244 sucking the molded product P move further downward, the suction port 2452 connected to the pocket 243 via the inner passage 2451 leaves the position vertically above the slot 254 to stop suction of the pocket 243 and cause the molded product P not to be sucked to the pocket 243. In contrast, the suction bore 244 sucking the molded product P is still positioned vertically above the slot 255, to allow the molded product P to be continuously sucked to and captured by the suction bore 244.

When the suction bore 244 sucking the molded product P moves downstream and comes close to the delivery position 27 for the molded product P to the conveying device D1, the suction port 2452 connected, via the inner passage 2451, with the pocket 243 paired with the suction bore 244 reaches vertically above the slot 256 and the negative pressure feeding duct 25 starts sucking the pocket 243 to allow the molded product P to be sucked also to the pocket 243 only temporarily.

When the pocket 243 and the suction bore 244 sucking the molded product P subsequently reach the position just before the delivery position 27, the suction bore 244 leaves the position vertically above the slot 255 to stop suction of the suction bore 244 and cause the molded product P not to be sucked to the suction bore 244. Substantially simultaneously or immediately thereafter, the suction port 2452 connected to the pocket 243 sucking the molded product P via the inner passage 2451 leaves the position vertically above the slot 256 to also stop suction of the pocket 243 and cause the molded product P not to be sucked to the pocket 243. The molded product P in this state is delivered from the rotator 24 of the conveying device C1 to a rotator 28 of the conveying device D1.

The foreign matter inspection device (possibly a metal detector) C2 configured to inspect whether or not the molded products P each contain any foreign matter or the quality inspection device C2 configured to inspect quality such as components of the molded products P, and the exterior inspection device C3 configured to inspect the exterior condition of each of the molded products P, are disposed partially in a conveyance section of the molded products P from the delivery position 23 to the delivery position 27 in the outer circumferential portion of the rotator 24, as processing devices included in the module C.

Figure 10:
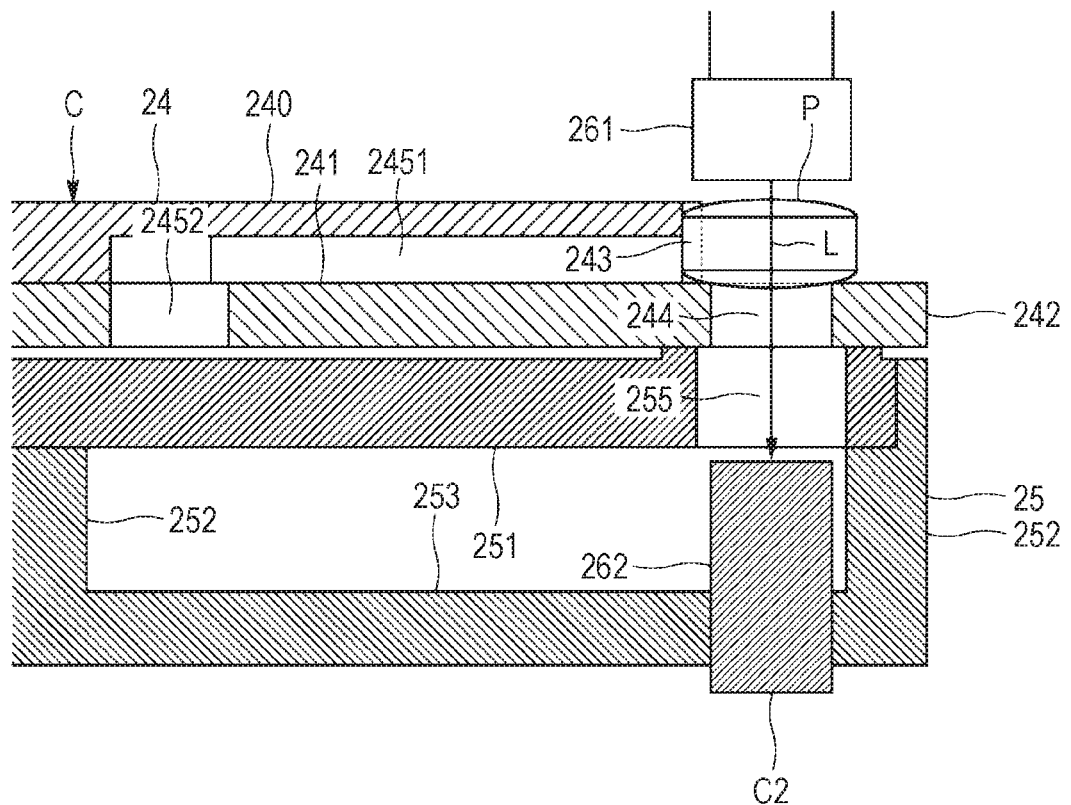
FIG. 10 is a longitudinal sectional view of main parts of the molded product conveying device and a processing device according to the exemplary embodiment.

As shown exemplarily in FIG. 10, the foreign matter inspection device or quality inspection device C2 includes, as constituent elements, a light source 261 positioned to overlap a travel locus of the molded products P conveyed by the conveying device C1 in a planar view, and a sensor 262 functioning as a light receiving element. The light source 261 and the sensor 262 are disposed to vertically face each other along the rotary axis of the rotator 24, and sandwich the molded product P and the rotator 24 configured to convey the molded products P. The light source 261 emits light or an electromagnetic wave L that includes transmitted light L through the molded product P to be incident on the sensor 262 as signal light. The signal light L is analyzed to inspect whether or not the molded product P contains any foreign matter and/or whether or not the molded product P has appropriate quality such as components. The device C2 can be configured to execute near infrared reflectance or X-ray inspection (e.g., radioscopy or transmission measurement).

Figure 11:
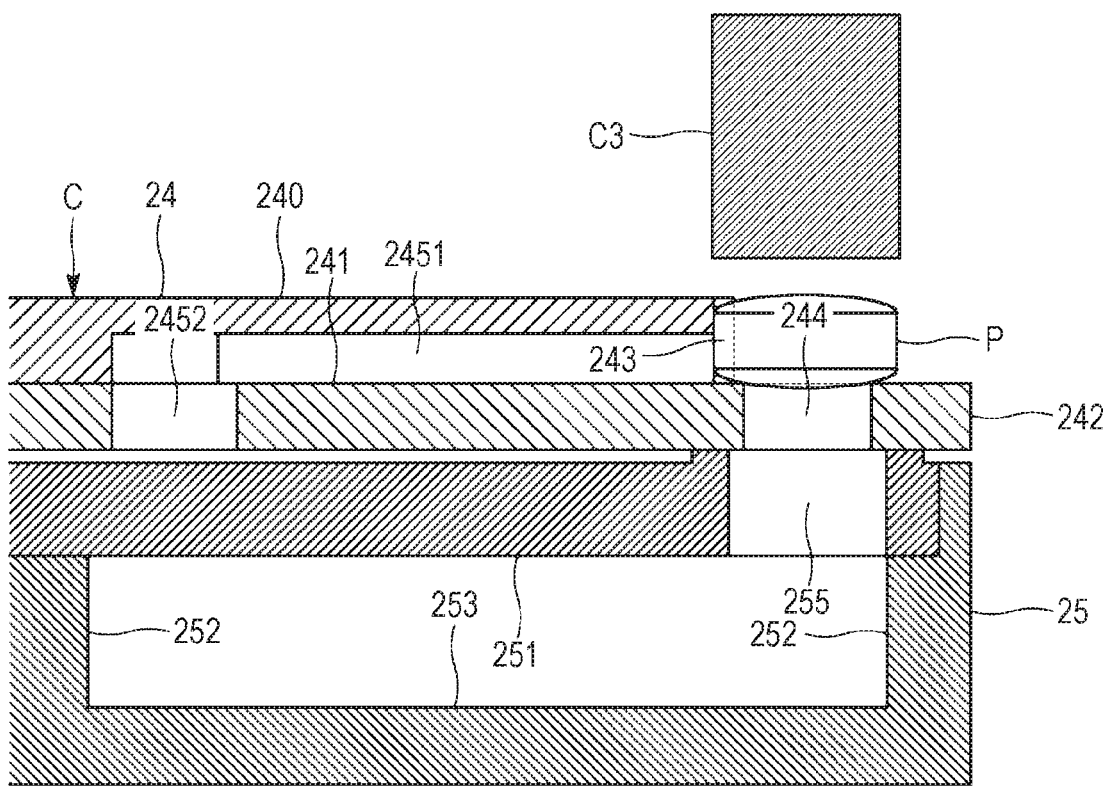
FIG. 11 is a longitudinal sectional view of main parts of the molded product conveying device and the processing device according to the exemplary embodiment.

As shown exemplarily in FIG. 11, the exterior inspection device C3 includes a camera configured to image a predetermined surface like the upper surface of each of the molded products P captured by the suction bore 244 and transferred, to obtain a picture thereof. The obtained picture can be used for inspection of the exterior condition of the molded product P. Specifically, the obtained picture can be analyzed, be compared with a picture of a normal molded product P, or the like to enable determination of whether the exterior of the molded product P is in a normal or a defective condition.

The camera in the exterior inspection device C3 can be configured to image the upper surface of the molded product P as well as the lower surface of the molded product P. Pictures of the upper surface and the lower surface of the molded product P can be analyzed to obtain a width, a length, a diameter, and an area, and the like of the molded product P. A side surface of the molded product P can optionally be imaged for determination of whether the molded product P is in a normal or a defective condition. The picture of the side surface of the molded product P can be analyzed to obtain a height (i.e., thickness) of the molded product P. The exterior inspection device C3, functioning as a three-dimensional measurement device adopting an optical cutting method, is configured to obtain three-dimensional data on the molded product P, and the obtained data can be analyzed for determination of whether the exterior of the molded product P is in a normal or a defective condition. The exterior inspection device C3 can be configured to execute either one of these processes, or can be configured to execute some of the processes in combination.

The suction bores 244 each capturing the molded product P vertically penetrates the flange 242 of the rotator 24, and first one of the light source 261 and the sensor 262 is positioned vertically above the flange 242, whereas second one thereof is positioned vertically below the flange 242. In a planar view in the vertical direction, the peripheral edge of the suction bore 244 is entirely closed continuously and is sized and shaped to be located inside the outer edge of the molded product P sucked to the suction bore 244. When the suction bore 244 capturing the molded product P passes through areas of the foreign matter inspection device or quality inspection device C2 and the exterior inspection device C3, the molded product P tightly adheres to the suction bore 244 with no gap between the peripheral edge of the suction bore 244 and the outer edge of the molded product P due to negative pressure fed from the duct 25 into the suction bore 244.

In the foreign matter inspection device or quality inspection device C2, the signal light L, having transmitted through the molded product P, is appropriately incident on the sensor 262 via the suction bore 244, whereas stray light other than the signal light L, which has not transmitted though the molded product P, is shielded by the rotator 24 and the flange 242 to be inhibited from being incident on the sensor 262. The molded product P sucked to the suction bore 244 and retained is conveyed in the rotation direction of the rotator 24 while being constantly positioned relatively to the rotator 24 and the suction bore 244. This is effectual for processing of analyzing the signal light L having transmitted through the molded product P that has received light or the electromagnetic wave L, processing of imaging the molded product P with use of a camera for an exterior inspection, and the like.

The die table 31 of the molding machine A, the rotator 17 of the discharge device B1 in the module B, and the rotator 24 of the conveying device C1 in the module C rotate in synchronization with one another. The controller of the molding machine A and the processing system S according to the exemplary embodiment refers to a signal outputted from the angular position sensor (e.g., a rotary encoder) accompanying the turret 3 of the molding machine A, the rotator 17 of the discharge device B1, or the rotator 24 of the conveying device C1 to find current positions of the suction bores 244 aligned circumferentially around the rotary axis of the rotator 24. Furthermore, it is possible to find a current position in the module C, of the molded product P compression molded in the die bore 4 having a certain order number in the die table 31 of the molding machine A. This indicates that the molded product P having just passed in front of the sensor 262 of the foreign matter inspection device or quality inspection device C2 or the camera of the exterior inspection device C3 (i.e., having gone through foreign matter inspection, quality inspection, or exterior inspection), is molded in the die bore 4 having a certain order number. The controller stores to hold in the storage device, information on a result of inspection of the exterior or the like of the molded product P (i.e., a result of determination of whether or not the target molded product P contains any foreign matter, whether or not the target molded product P has defective quality, whether the exterior of the target molded product P is in an normal or defective condition, or the like) with use of the foreign matter inspection device or quality inspection device C2, or the exterior inspection device C3, in association with an ID number indicating a certain order number of the die bore 4 used for molding the target molded product P.

The conveying device D1 in the module D, connected behind the module C, receives the molded products P from the conveying device C1 at the delivery position 27 for the molded products P, and conveys the molded products P to a processing devices D2 configured to apply a subsequent process to the molded products P. The molded products P are kept aligned in the order of molding by the molding machine A also when the molded products P are delivered from the conveying device C1 to the conveying device D1. As shown exemplarily in FIGS. 12 to 15, the conveying device D1 mainly includes the rotator 28 configured to horizontally rotate about a vertical axis in synchronization with the rotator 28 of the conveying device C1.

The rotator 28 rotates clockwise in the figures relatively to the rotator 28 that rotates counterclockwise in the figures. In order to synchronize rotation between the rotator 28 and the rotator 28, the rotators 28 can each be rotated by a motor configured as a servo motor or a stepping motor, and angular-position sensors such as rotary encoders can detect a rotation angle and rotational speed of each of the rotator 28 and the rotator 28, to enable a feedback control of a rotational speed of the motor for synchronized rotation between the rotator 28 and the rotator 28. The rotator 28 and the rotator 28 are alternatively mechanically connected to interlock via a gear transmission mechanism, a winding transmission mechanism, or the like.

The rotator 28 has a substantially circular disc shape in a planar view along a rotary axis of the rotator 28 (i.e., in the vertical direction). More specifically, the rotator 28 includes two circular disc plates 280 and 281 sized differently in outer diameter such that the circular disc plate 281 having a larger outer diameter is overlapped on the circular disc plate 280 having a smaller outer diameter to be firmly coupled with each other and be integrated. The upper circular disc plate 281 has an outer circumferential portion 282 that accordingly expands radially outward and perpendicularly to the rotary axis of the rotator 28, from a basal portion of the rotator 28 (i.e., an outer circumferential edge of the lower circular disc plate 280). The outer circumferential portion 282 serves as a flange of the rotator 28.

The basal portion 280 of the rotator 28 has an outer circumferential surface including pockets 283 that are recessed radially inward and are opened radially outward. The outer circumferential edge of the basal portion 280 has a substantially circular shape and is recessed to come closer to the rotary axis of the rotator 28 only at the pockets 283. The flange 282 includes suction bores 284 positioned to confront the pockets 283 at second ends along the rotary axis (i.e., confront from above, and each having a closed peripheral edge). When the rotator 28 is viewed vertically, each of the suction bores 284 is at least partially overlapped with a corresponding one of the pockets 283 and is opened downward toward the pocket 283. The suction bores 284 each have an inner peripheral edge extending along an inner wall surface of the pocket 283 in a planar view. Each of the suction bores 284 vertically penetrates the flange 282.

The pockets 283 and the suction bores 284 are disposed along the outer end of the rotator 28 circumferentially around the rotary axis of the rotator 28, to be spaced apart from each other at predetermined intervals. These pockets 283 and the suction bores 284 obviously rotate integrally with the rotator 28. Each of the molded products P, delivered from the conveying device C1 in the module C to the conveying device D1 in the module D, is transferred while being engaged with the pocket 283 and the suction bore 284 of the rotator 28 and captured by the suction bore 284.

Figure 13:
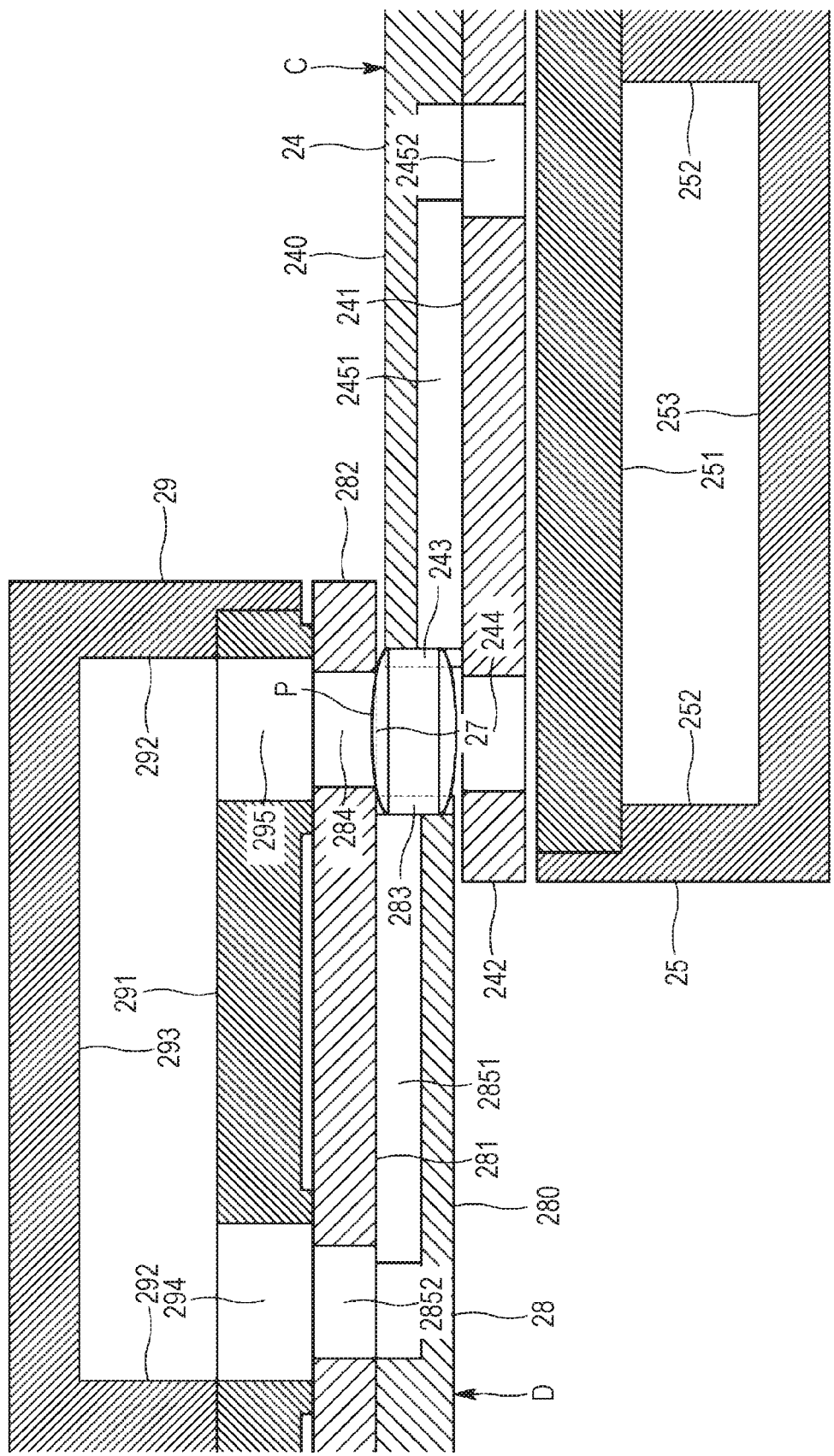
FIG. 13 is a longitudinal sectional view of a main part of the molded product conveying device according to the exemplary embodiment.

As shown exemplarily in FIG. 13, in the outer circumferential portion of the rotator 28 in the conveying device D1, the flange 282 has a lower surface positioned above the upper surface of flange 242 in the outer circumferential portion of the rotator 24 of the conveying device C1 in the module C. The outer circumference and the pockets 283 in the basal portion 280 of the rotator 28 are substantially flush with the basal portion 240 and the pockets 243 of the rotator 24 to horizontally face the basal portion 240 and the pockets 243. Furthermore, the flange 282 of the rotator 28 partially overlaps the flange 242 of the rotator 24 from above in a planar view, to vertically face the flange 242. Synchronous rotation between the rotator 24 and the rotator 28 causes each of the suction bores 244 and a corresponding one of the suction bores 284 to temporarily overlap each other at the delivery position 27. The basal portion 240 of the rotator 24 has an upper surface slightly lower than the lower surface of the flange 282 of the rotator 28, and the upper surface of the flange 242 of the rotator 24 is slightly lower than a lower surface of the basal portion 280 of the rotator 28, to prevent interference between the rotator 24 and the rotator 28.

At the delivery position 27, the molded product P captured by the suction bore 244 of the rotator 24 and being transferred shifts from on the flange 242 of the rotator 24 to vertically below the flange 282 of the rotator 28. The molded product P enters the pocket 283 in the rotator 28 and is captured by the suction bore 284. The molded products P are each accommodated in one of the suction bores 284. The suction bores 284 thus engage with the molded products P one by one in the order of alignment of the suction bores 244 in the rotator 24 of the conveying device C1 (i.e., keeping the order of compression molding the molded products P by the molding machine A). The molded products P will not be reversed vertically while being delivered from the rotator 24 of the conveying device C1 to the rotator 28 of the conveying device D1.

The molded products P captured by the suction bores 284 are transferred along a rotation locus of the suction bores 284 due a to rotation of the rotator 28. Each of the molded products P accommodated in the suction bore 284 is substantially constantly positioned relatively to the rotator 28 and the suction bore 284. The molded product P receives a centrifugal force due to the rotation of the rotator 28, but is sucked to the suction bore 284 so as not to be displaced outward and drop out of the suction bore 284. Furthermore, the molded products P will not be reversed vertically in the transfer process.

The molded product P captured by the suction bore 284 is eventually transferred to a transfer end position E by the conveying device D1 unless being removed by a removal device D3 to be described later. The molded product P leaves the suction bore 284 of the rotator 28 at the end position E, to be delivered to a device configured to apply a subsequent process to the molded products P or flow downward into a container or the like collecting the molded products P.

Described below is a mechanism configured to suck the molded products P to the pockets 283 and the suction bores 284 of the rotator 28. The pockets 283 and the suction bores 284 each have negative pressure, to suck the molded product P in the pocket 283 and the suction bore 284. As shown exemplarily in FIGS. 12 to 15, the rotator 28 preliminarily includes suction passages 2851 and 2852 configured to feed the pockets 283 with negative pressure. The suction passages 2851 and 2852 include an inner passage 2851 having a start portion opened at an innermost position in the inner wall surface of each of the pockets 283, formed inside the rotator 28, and extending inward toward the rotary axis of the rotator 28, and a suction port 2852 formed by drilling downward from an upper surface of the rotator 28 to an end portion of the inner passage 2851 to allow the inner passage 2851 to communicate with the upper surface of the rotator 28. Specifically, the inner passage 2851 is a groove disposed in the upper surface of the lower circular disc plate 280 as the basal portion of the rotator 28 and opened upward. The groove 2851 is closed from above, by the circular disc plate 281 joined to the upper surface of the circular disc plate 280.

The suction port 2852 is a through hole vertically penetrating a part of the upper circular disc plate 281, positioned vertically above the end portion of the inner passage 2851. The suction passages 2851 and 2852 allow each of the pockets 283 to communicate with the position of the suction port 2852 displaced inward from the pocket 283 in the upper surface of the rotator 28. The numbers of the suction passages 2851 and 2852 are equal to the number of pairs of the pockets 283 and the suction bores 284.

Atmospheres in the inner passages 2851 and the pockets 283 can be sucked via the suction ports 2852 to feed the pockets 283 with negative pressure. The rotator 28 is equipped thereabove with a negative pressure feeding duct 29 that extends along the outer circumference of the rotator 28 in a planar view to have a semi-arc shape. The duct 29 has a tubular body surrounding its internal space with a bottom wall 291 immediately close to the upper surface of the rotator 28, side walls 292 vertically extending upward from an inner side end and an outer side end of the bottom wall 291, and a top wall 293 connecting upper ends of the side walls 292. The internal space of the duct 29 is sucked by a pump (not shown) to have negative pressure.

The bottom wall 291 of the duct 29 includes a slot 294 that is positioned vertically above the suction ports 2852 and has a partial arc shape around the rotary axis of the rotator 28 in a planar view. The slot 294 vertically penetrates the bottom wall 291. The slot extends along a travel locus of the suction ports 2852 according to rotation of the rotator 28. The slot 294 extends along rotation of the rotator 28 in a range from a position upstream of the delivery position 27 for the molded products P from the conveying device C1, to a predetermined position downstream of the delivery position 27.

Each of the pockets 283 is fed with negative pressure or is sucked only while the suction port 2852 in the suction passages 2851 and 2852 connected to the pocket 283 is positioned vertically below the slot 294 (i.e., while the internal space having negative pressure in the duct 29 communicates with the pocket 283). When the suction port 2852 is not positioned vertically below the slot 294, the bottom wall 291 is located between the internal space of the duct 29 and the suction port 2852 to isolate the internal space of the duct 29 from the pocket 283 and prevent suction of the pocket 283.

The duct 29 also functions to feed the suction bores 284 with negative pressure. The bottom wall 291 of the duct 29 includes a slot 295 that is positioned vertically above the suction bores 284 and has a partial arc shape around the rotary axis of the rotator 28 in a planar view. The slot 295 also vertically penetrates the bottom wall 291. The slot 295 extends along the travel locus of the suction bores 284 according to rotation of the rotator 28. The slot 295 extends along rotation of the rotator 28 in a range from the delivery position 27 for the molded products P from the conveying device C1, to a position just before the conveyance end position E for the molded products P by the conveying device D1.

Each of the suction bores 284 is fed with negative pressure or is sucked only while the suction bore 284 is positioned vertically below the slot 295 (i.e., while the internal space having negative pressure in the duct 29 communicates with the suction bore 284). When the suction bore 284 is not positioned vertically below the slot 295, the bottom wall 291 isolates the internal space of the duct 29 from the suction bore 284 to prevent suction of the suction bore 284.

In a process of delivering the molded product P captured by the pocket 243 and the suction bore 244 of the rotator 24 in the conveying device C1 to a corresponding pair of the pocket 283 and the suction bore 284 of the rotator 28 in the conveying device D1, the pair of the pocket 283 and the suction bore 284 positioned upstream of the delivery position 27 and not retaining the molded product P initially moves toward the delivery position 27. When the pair of the pocket 283 and the suction bore 284 reach a position just before the delivery position 27, the suction port 2852 connected to the pocket 283 via the inner passage 2851 reaches vertically below the slot 294 and the negative pressure feeding duct 29 starts sucking the pocket 283. The suction bore 284 paired with the pocket 283 has not yet reached vertically below the slot 295 at this point, so that the suction bore 284 is not sucked.

In the conveying device C1, the pair of the pocket 243 and the suction bore 244 located upstream of the delivery position 27 and retaining the molded product P moves toward the delivery position 27. When the pair of the pocket 243 and the suction bore 244 subsequently reach the position just before the delivery position 27, the suction bore 244 leaves the position vertically above the slot 255 of the duct 25 to stop suction of the suction bore 244 and cause the molded product P not to be sucked to the suction bore 244. Substantially simultaneously or immediately thereafter, the suction port 2452 connected to the pocket 243 sucking the molded product P via the suction passages 2451 and 2452 leaves the position vertically above the slot 256 to also stop suction of the pocket 243 and cause the molded product P not to be sucked to the pocket 243. The molded product P having reached the delivery position 27 is thus simply mounted on the flange 242 of the rotator 24 in the conveying device C1 and is captured by neither the pocket 243 nor the suction bore 244.

When the pair of the pocket 283 and the suction bore 284 not retaining the molded product P in the conveying device D1 reaches the delivery position 27 for the molded products P, the suction bore 284 reaches vertically below the slot 295 and the negative pressure feeding duct 29 starts sucking the suction bore 284. The suction port 2852 connected to the pocket 283 via the inner passage 2851 is still positioned vertically below the slot 294 at this point, and both the pocket 283 and the suction bore 284 are fed with negative pressure. At the delivery position 27, the molded product P on the flange 242 of the rotator 24 in the conveying device C1 is accordingly sucked inward to come closer to the rotary axis of the rotator 28, toward the pocket 283 of the rotator 28 in the conveying device D1, to shift to below the flange 282 and be engaged with the pocket 283. The molded product P is thus constantly positioned relatively to the suction bore 284. The molded product P is sucked to the pocket 283 as well as to the suction bore 284.

When the rotator 28 rotates and the pair of the pocket 283 and the suction bore 284 sucking the molded product P moves downstream from the delivery position 27 at least a certain distance, the suction port 2852 connected to the pocket 283 via the inner passage 2851 leaves the position vertically below the slot 294 to stop suction of the pocket 283 and cause the molded product P not to be sucked to the pocket 283. In contrast, the suction bore 284 sucking the molded product P is still positioned vertically below the slot 295, to allow the molded product P to be continuously sucked to and captured by the suction bore 284.

When the suction bore 284 sucking the molded product P subsequently reaches the position just before the end position E, the suction bore 284 leaves the position vertically below the slot 295 to stop suction of the suction bore 284 and cause the molded product P not to be sucked to the suction bore 284. Each of the molded products P thus leaves the suction bore 284 of the rotator 28 and falls from the flange 282, to be delivered to a device configured to apply a subsequent process to the molded products P or flow downward into a container or the like collecting the molded products P.

The exterior inspection device D2 configured to inspect the exterior condition of each of the molded products P is disposed partially in a conveyance section of the molded products P from the delivery position 27 to the end position E in the outer circumferential portion of the rotator 28, as a processing device included in the module D.

Figure 14:
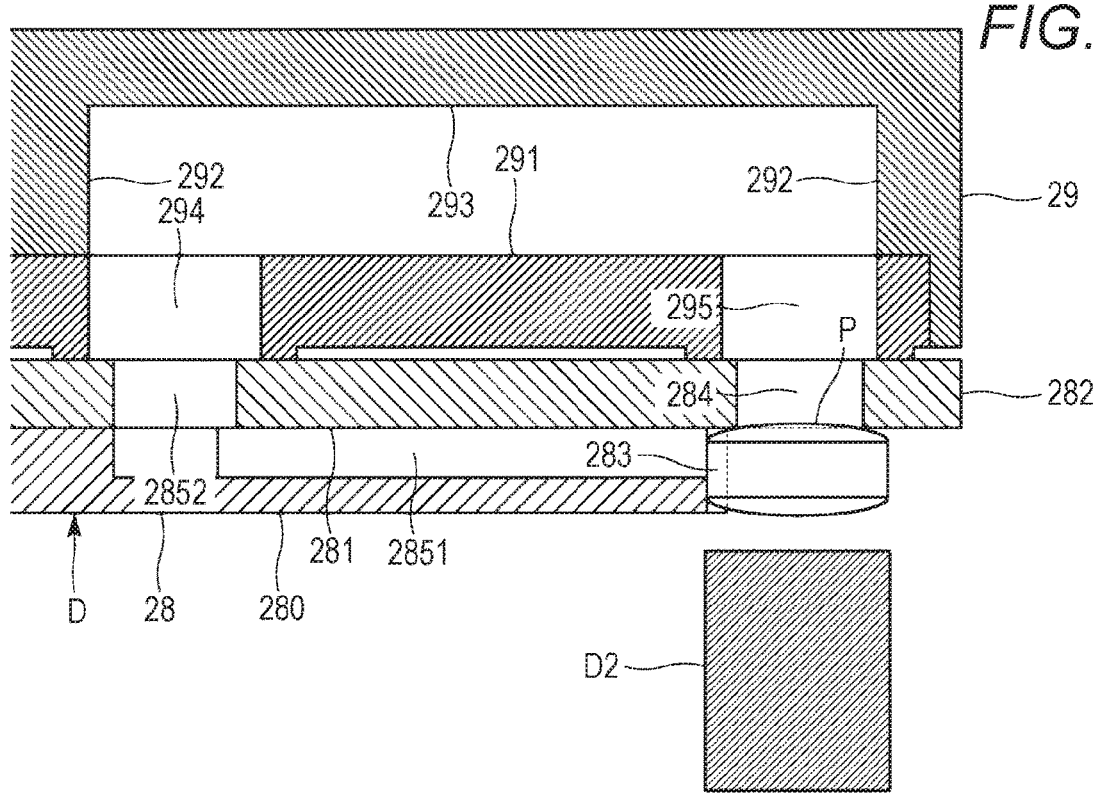
FIG. 14 is a longitudinal sectional view of main parts of the molded product conveying device and the processing device according to the exemplary embodiment.

As shown exemplarily in FIG. 14, the exterior inspection device D2 includes a camera configured to image a predetermined surface like the lower surface of each of the molded products P captured by the suction bore 284 and transferred, to obtain a picture thereof. The obtained picture can be used for inspection of the exterior condition of the molded product P. Specifically, the obtained picture can be analyzed, be compared with a picture of a normal molded product P, or the like to enable determination of whether the exterior of the molded product P is in a normal or a defective condition.

The camera in the exterior inspection device D2 can be configured to image the lower surface of the molded product P as well as the upper surface of the molded product P. Pictures of the upper surface and the lower surface of the molded product P can be analyzed to obtain a width, a length, a diameter, and an area, and the like of the molded product P. A side surface of the molded product P can optionally be imaged for determination of whether the molded product P is in a normal or a defective condition. The picture of the side surface of the molded product P can be analyzed to obtain a height (i.e., thickness) of the molded product P. The exterior inspection device D2, functioning as a three-dimensional measurement device adopting an optical cutting method, is configured to obtain three-dimensional data on the molded product P, and the obtained data can be analyzed for determination of whether the exterior of the molded product P is in a normal or a defective condition. The exterior inspection device D2 can be configured to execute either one of these processes, or can be configured to execute some of the processes in combination.

In a planar view in the vertical direction, the peripheral edge of the suction bore 284 is entirely closed continuously and is sized and shaped to be located inside the outer edge of the molded product P sucked to the suction bore 284. When the suction bore 284 capturing the molded product P passes through the area of the exterior inspection device D2, the molded product P tightly adheres to the suction bore 284 with no gap between the peripheral edge of the suction bore 284 and the outer edge of the molded product P due to negative pressure fed from the duct 29 into the suction bore 284. The molded product P sucked to the suction bore 284 and retained is conveyed in the rotation direction of the rotator 28 while being constantly positioned relatively to the rotator 28 and the suction bore 284. This is effectual for processing of imaging the molded product P with use of a camera for exterior inspection, and the like.

The die table 31 of the molding machine A, the rotator 17 of the discharge device B1 in the module B, the rotator 24 of the conveying device C1 in the module C, and the rotator 28 of the conveying device in the module D rotate in synchronization with one another. The controller of the molding machine A and the processing system S refers to a signal outputted from the angular position sensor (e.g., a rotary encoder) accompanying the turret 3 of the molding machine A, the rotator 17 of the discharge device B1, the rotator 24 of the conveying device C1, or the rotator 28 of the conveying device D1 to find current positions of the suction bores 284 aligned circumferentially around the rotary axis of the rotator 28.

Furthermore, it is possible to find a current position in the module D, of the molded product P compression molded in the die bore 4 having a certain order number in the die table 31 of the molding machine A. This indicates that the molded product P having just passed in front of the camera of the exterior inspection device D2 (i.e., having gone through exterior inspection), is molded in the die bore 4 having a certain order number. The controller stores to hold in the storage device, information on a result of an exterior inspection of the molded product P (i.e., a result of determination of whether the exterior of the target molded product P is in a normal or a defective condition, or the like) with use of the exterior inspection device D2, in association with an ID number indicating a certain order number of the die bore 4 used for molding the target molded product P.

The molded product P captured by the suction bore 284 of the rotator 28 in the conveying device D1 is ordinarily transferred to the transfer end position E. There is, however, a demand for removal or collection of specific one of the molded products P, such as a defective product or a sampled product by selecting from among the molded products P to be transferred to the end position E.

Figure 12:
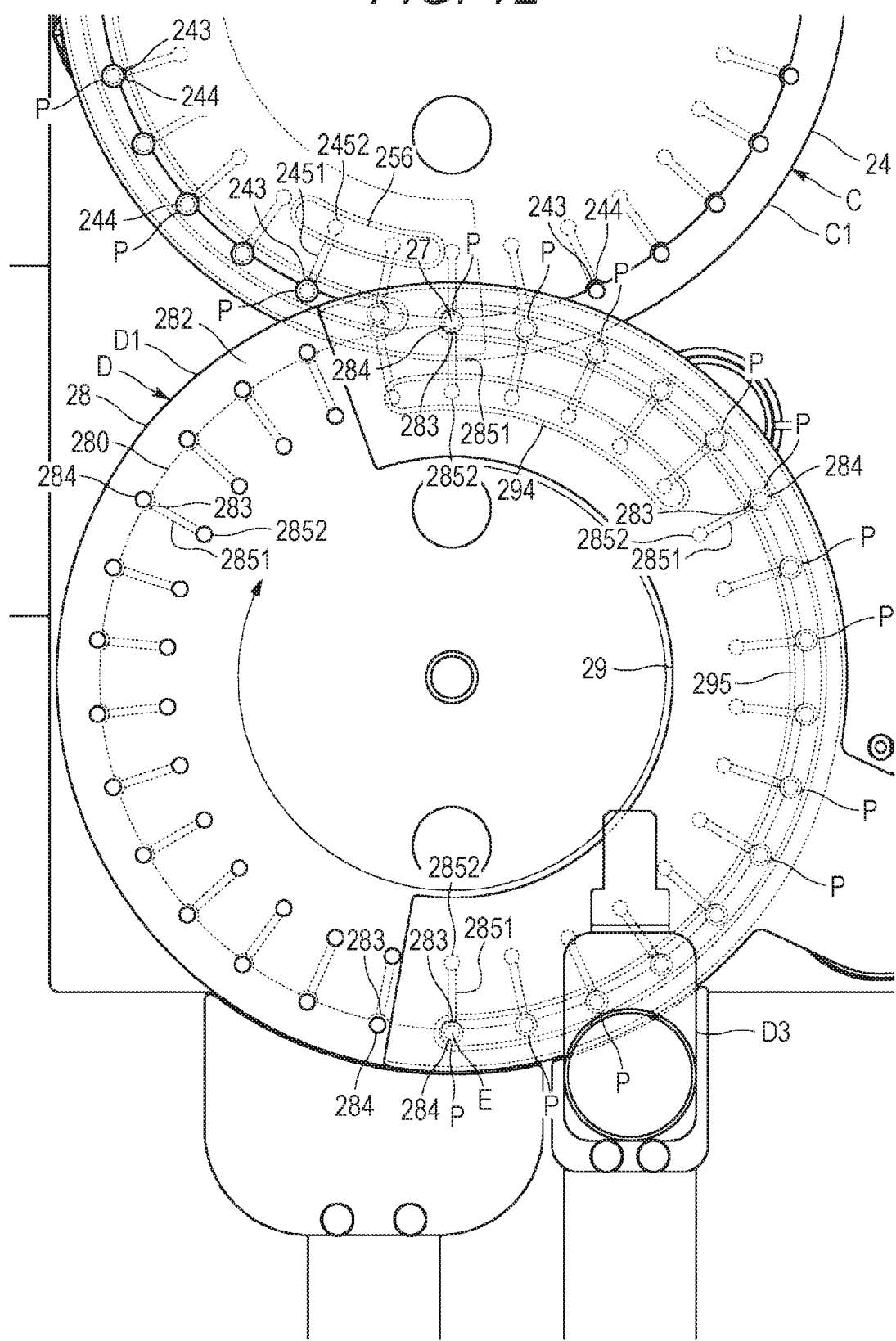
FIG. 12 is a plan view of a main part of the molded product conveying device according to the exemplary embodiment.
Figure 15:
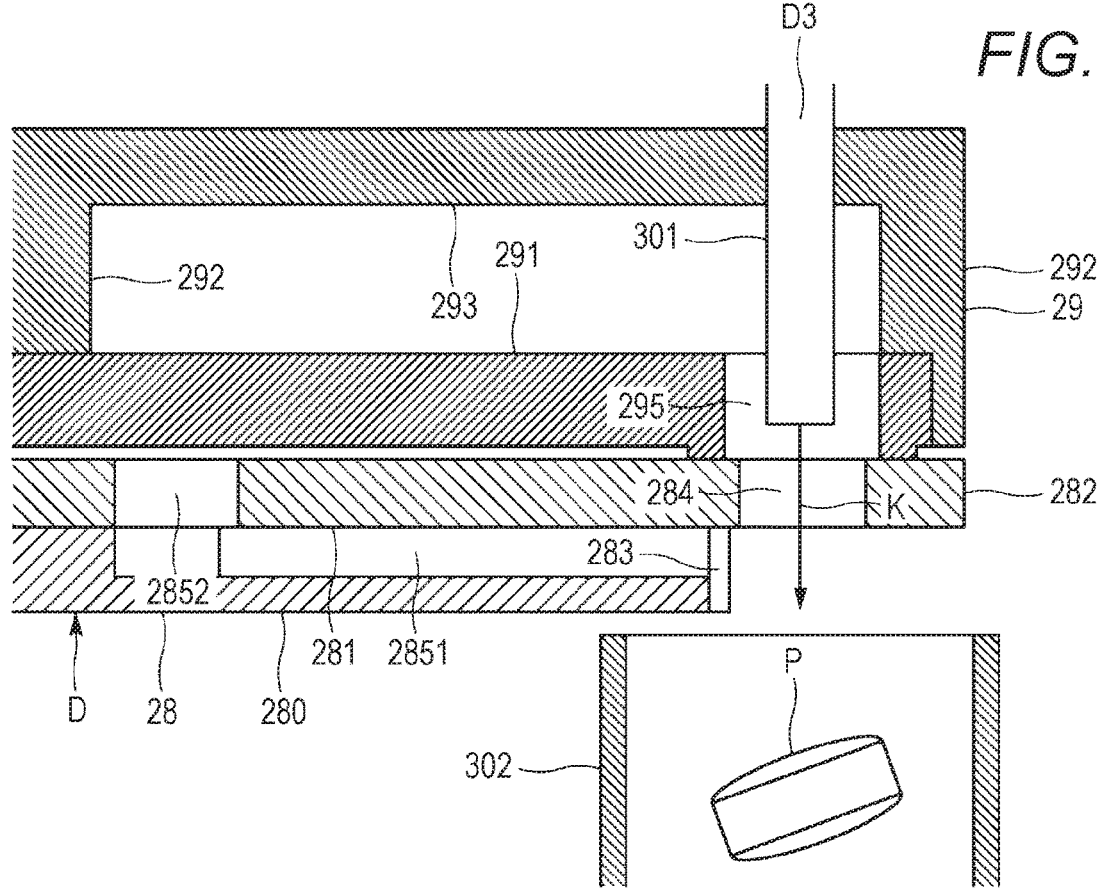
FIG. 15 is a longitudinal sectional view of main parts of the molded product conveying device and a removal device according to the exemplary embodiment.

As shown exemplarily in FIGS. 12 and 15, the removal device D3 configured to remove specific one of the molded products P is preferably disposed halfway on the rotation locus of the suction bores 284 and the molded products P to the end position E in the conveying device D1 in the module D. The removal device D3 includes, as constituent elements, a spray nozzle 301 configured to spray the compressed air K toward the molded product P engaged with the suction bore 284, and a chute 302 configured to receive the molded product P falling by being blown off by the compressed air K. The spray nozzle 301 and the chute 302 are disposed to vertically face each other and sandwich the suction bore 284 sucking the molded product P. The spray nozzle 301 sprays the compressed air K to remove the molded product P retained by the suction bore 284, and the chute 302 receives to collect the molded product P detached from the flange 282 of the rotator 28. The compressed air K can have small injection quantity (i.e., a flow rate per unit time) and small injection pressure. The spray nozzle 301 has a relative position to the rotator 28 and a direction of spraying the compressed air K, which are set appropriately to allow the molded product P to be detached from the flange 282.

The controller of the molding machine A and the processing system S identifies that the die bore 4 having a certain order number in the molding machine A is used for molding the molded product P engaged with each of the suction bores 284 in the rotator 28. The controller stores, for each of the molded products P, information on results of various inspection of the molded product P, namely, whether compression pressure for compression molding is normal or defective, whether or not the molded product P contains any foreign matter, whether or not the molded product P has defective quality, whether the exterior of the molded product P is normal or defective, and the like, in association with an ID number indicating a certain order number of the die bore 4 used for molding the molded product P in the molding machine A. The controller accordingly recognizes whether the molded product P engaged with each of the suction bore 284 of the rotator 28 is normal or defective, and can find a current position of the suction bore 284 engaged with a defective molded product P.

The controller transmits a control signal for opening a valve configured to control the flow of the compressed air K (possibly incorporated in the spray nozzle 301) when the suction bore 284 capturing the defective molded product P passes near the spray nozzle 301, to cause the spray nozzle 301 to spray the compressed air K toward the defective molded product P to drop and remove the molded product P from the rotator 28. The molded product P falling onto the chute 302 cannot reach the end position E.

The molded product P sucked to the suction bore 284 is conveyed in the rotation direction of the rotator 28 while being constantly positioned relatively to the rotator 28 and the suction bore 284. This is effectual also for processing of spraying the compressed air K toward the molded product P engaged with specific one of the suction bores 284 to remove or extract the molded product P.

The exemplary embodiment provides a molded product conveying device C1, D1 configured to suck a molded product P to a rotator 24, 28 rotating about a predetermined rotary axis and convey the molded product P along a rotation orbit. The conveying device C1, D1 includes a pocket 243, 283 disposed along an outer circumference of the rotator 24, 28, recessed inward and opened outward radially and perpendicularly to the rotary axis, and fed therein with negative pressure to suck the molded product P, and a suction bore 244, 284 positioned to confront the pocket 243, 283 at a first (i.e., lower) end or a second (i.e., upper) end along the rotary axis of the rotator 24, 28, opened toward the pocket 243, 283 to be at least partially overlapped with the pocket 243, 283 when viewed along the rotary axis, and fed therein with negative pressure to suck the molded product P. The exemplary embodiment enables the molded product P to be conveyed to be sucked to the pocket 243, 283 and thus be constantly positioned relatively to the suction bore 244, 284 as well as sucked to the suction bore 244, 284 for conveyance.

Particularly in the conveying device C1, at a delivery position 23 set as a predetermined position on a rotation orbit of the pocket 243 and the suction bore 244, where the molded product P is received and sucked, the pocket 243 is preliminarily fed with negative pressure, the suction bore 244 is not fed with negative pressure, and the molded product is initially sucked to the pocket 243, and after the pocket 243 and the suction bore 244 pass the delivery position 23, the suction bore 244 starts being fed with negative pressure and the molded product sucked to the pocket 243 is sucked to the suction bore 244. This configuration further reduces variation in a relative position of the molded product P to the suction bore 244, in comparison to a case where the molded product is directly sucked to the suction bore 244 at the delivery position 23.

The conveying device C1, D1 according to the exemplary embodiment includes the plurality of rotators 24, 28 disposed adjacent to each other to have the rotary axes in parallel with each other, to enable conveyance of the molded product P a longer distance. The rotators 24, 28 each include a basal portion 240, 280 having a substantially circular disc shape when viewed along the rotary axis, and a flange 242, 282 expanding radially outward from an outer circumferential edge of the basal portion 240, 280. The basal portion 240, 280 includes the pocket 243, 283 disposed at an outer circumference, and the flange 242, 282 includes the suction bore 244, 284 positioned to confront the pocket 243, 283. At a delivery position 27 set as a predetermined position on a rotation orbit of the pocket 243, 283 and the suction bore 244, 284, where the molded product P is delivered between the adjacent rotators 24, 28, the basal portion 240 of the first rotator 24 and the basal portion 280 of the second rotator 28 are substantially flush with each other, the flange 242 of the first rotator 24 and the flange 282 of the second rotator 28 face each other along the rotary axes, and the suction bore 244 at the flange 242 of the first rotator 24 is overlapped with the suction bore 284 at the flange 282 of the second rotator 28 when viewed along the rotary axes.

The module C includes the conveying device C1 in which the rotator 24 includes a basal portion 240 having a substantially circular disc shape when viewed along the rotary axis, and a flange 242 expanding radially outward from an outer circumferential edge of the basal portion 240, the basal portion 240 has the pocket 243 disposed at an outer circumference, the flange 242 has the suction bore 244 positioned to confront the pocket 243, the suction bore 244 is a through hole penetrating the flange 242 and having a closed peripheral edge, and is sized and shaped to have the peripheral edge located inside an outer edge of the molded product P sucked to the suction bore when viewed along the rotary axis, and the conveying device is accompanied by an inspection device C2 including a light source 261 configured to irradiate the molded product P sucked to the suction bore 244 with light or an electromagnetic wave L, and a light receiving element 262 configured to receive light or the electromagnetic wave L having transmitted through the molded product P and having passed through the suction bore 244. Such a configuration allows only light or the electromagnetic wave L having transmitted through the molded product P to be incident on the light receiving element 262, and shields light or an electromagnetic wave not having transmitted through the molded product P but diffracted with use of the rotator 24 and the flange 242 so as not to be incident on the light receiving element 262, to improve accuracy in inspection of the molded product P with use of the inspection device C2.

The exemplary invention is not limited to the exemplary embodiment detailed above. Any device accompanying the module B, C, or D of the processing system S and configured to apply a post process to the molded product P is obviously not limited to those exemplified above. Specific examples of such a device include a typing device such as a laser beam machine configured to irradiate the molded product P with laser beams to engrave or apply laser marking on the exterior of the molded product P, a printing device as an ink jet printer configured to apply ink jet printing to a surface of the molded product P, and a wrapping device configured to wrap the molded product P in a press through pack (PTP) sheet, an easy seal open pack (ESOP) sheet, or the like.

Moreover, the specific configuration of each portion can be modified in various manners within the range not departing from the purpose of the exemplary invention.

The descriptions of the various exemplary embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

Further, Applicant's intent is to encompass the equivalents of all claim elements, and no amendment to any claim of the present application should be construed as a disclaimer of any interest in or right to an equivalent of any element or feature of the amended claim.

What is claimed is:

1. A molded product conveying device configured to suck a molded product to a rotator rotating about a predetermined rotary axis and to convey the molded product along a rotation orbit,
    the conveying device comprising:
        a pocket disposed along an outer circumference of the rotator, recessed inward and opened outward radially and perpendicularly to the rotary axis, and fed therein with a negative pressure to suck the molded product; and
        a suction bore positioned to confront the pocket, from a bottom surface of the pocket, at a first end or a second end along the rotary axis of the rotator, opened upward toward the pocket to be at least partially overlapped with the pocket when viewed in a stacking direction of the pocket on an upper surface of the suction bore along the rotary axis, and fed therein with the negative pressure to suck the molded product.

2. The molded product conveying device according to claim 1, wherein, at a delivery position set as a predetermined position on a rotation orbit of the pocket and the suction bore, where the molded product is received and sucked, the pocket is preliminarily fed with the negative pressure, the suction bore is not fed with the negative pressure, and the molded product is initially sucked to the pocket, and
    wherein, after the pocket and the suction bore pass the delivery position, the suction bore starts being fed with the negative pressure and the molded product sucked to the pocket is sucked to the suction bore.

3. The molded product conveying device according to claim 1, wherein the conveying device includes a plurality of rotators each comprising the rotator and disposed adjacent to each other to have rotary axes parallel to each other,
    wherein the rotators each include a basal portion having a substantially circular disc shape when viewed along the rotary axis, and a flange expanding radially outward from an outer circumferential edge of the basal portion, the basal portion includes the pocket disposed at an outer circumference, and the flange includes the suction bore positioned to confront the pocket, and wherein, at a delivery position set as a predetermined position on a rotation orbit of the pocket and the suction bore, where the molded product is delivered between the adjacent rotators, the basal portion of a first rotator of the rotators and the basal portion of a second rotator of the rotators are substantially flush with each other, the flange of the first rotator and the flange of the second rotator face each other along the rotary axes, and the suction bore at the flange of the first rotator is overlapped with the suction bore at the flange of the second rotator when viewed along the rotary axes.

4. The molded product conveying device according to claim 1, wherein the rotator includes a basal portion having a substantially circular disc shape when viewed along the rotary axis, and a flange expanding radially outward from an outer circumferential edge of the basal portion, the basal portion includes the pocket disposed at an outer circumference, and the flange includes the suction bore positioned to confront the pocket,
wherein the suction bore includes a through hole penetrating the flange and having a closed peripheral edge, and is sized and shaped to have a peripheral edge located inside an outer edge of the molded product sucked to the suction bore when viewed along the rotary axis, and
wherein the conveying device is accompanied by an inspection device including a light source configured to irradiate the molded product sucked to the suction bore with light or an electromagnetic wave, and a light receiving element configured to receive the light or the electromagnetic wave having transmitted through the molded product and having passed through the suction bore.

5. The molded product conveying device according to claim 2, wherein the conveying device includes a plurality of rotators each comprising the rotator and disposed adjacent to each other to have rotary axes parallel to each other,
wherein the rotators each include a basal portion having a substantially circular disc shape when viewed along the rotary axis, and a flange expanding radially outward from an outer circumferential edge of the basal portion, the basal portion includes the pocket disposed at an outer circumference, and the flange includes the suction bore positioned to confront the pocket, and
wherein, at a delivery position set as a predetermined position on a rotation orbit of the pocket and the suction bore, where the molded product is delivered between the adjacent rotators, the basal portion of a first rotator of the rotators and the basal portion of a second rotator of the rotators are substantially flush with each other, the flange of the first rotator and the flange of the second rotator face each other along the rotary axes, and the suction bore at the flange of the first rotator is overlapped with the suction bore at the flange of the second rotator when viewed along the rotary axes.

6. The molded product conveying device according to claim 2, wherein the rotator includes a basal portion having a substantially circular disc shape when viewed along the rotary axis, and a flange expanding radially outward from an outer circumferential edge of the basal portion, the basal portion includes the pocket disposed at an outer circumference, and the flange includes the suction bore positioned to confront the pocket,
wherein the suction bore includes a through hole penetrating the flange and having a closed peripheral edge, and is sized and shaped to have a peripheral edge located inside an outer edge of the molded product sucked to the suction bore when viewed along the rotary axis, and
wherein the conveying device is accompanied by an inspection device including a light source configured to irradiate the molded product sucked to the suction bore with light or an electromagnetic wave, and a light receiving element configured to receive the light or the electromagnetic wave having transmitted through the molded product and having passed through the suction bore.

7. The molded product conveying device according to claim 3, wherein the rotator includes a basal portion having a substantially circular disc shape when viewed along the rotary axis, and a flange expanding radially outward from an outer circumferential edge of the basal portion, the basal portion includes the pocket disposed at an outer circumference, and the flange includes the suction bore positioned to confront the pocket,
wherein the suction bore includes a through hole penetrating the flange and having a closed peripheral edge, and is sized and shaped to have a peripheral edge located inside an outer edge of the molded product sucked to the suction bore when viewed along the rotary axis, and
wherein the conveying device is accompanied by an inspection device including a light source configured to irradiate the molded product sucked to the suction bore with light or an electromagnetic wave, and a light receiving element configured to receive the light or the electromagnetic wave having transmitted through the molded product and having passed through the suction bore.

8. The molded product conveying device according to claim 1, wherein, at a delivery position set as a predetermined position on a rotation orbit of the pocket and the suction bore, the molded product is received and sucked.

9. A molded product conveying device configured to suck a molded-product to a rotator rotating about a redetermined rotary axis and to convey the molded product along a rotation orbit,
the conveying device comprising:
a pocket disposed along an outer circumference of the rotator, recessed inward and opened outward radially and perpendicularly to the rotary axis, and fed therein with a negative pressure to suck the molded product; and
a suction bore positioned to confront the pocket at a first end or a second end along the rotary axis of the rotator, opened toward the pocket to be at least partially overlapped with the pocket when viewed along the rotary axis, and fed therein with the negative pressure to suck the molded product,
wherein, at a delivery position set as a predetermined position, on a rotation orbit of the pocket and the suction bore, the molded product is received and sucked, and
wherein, after the pocket and the suction bore pass the delivery position, the suction bore starts being fed with the negative pressure and the molded product sucked to the pocket is sucked to the suction bore.

10. The molded product conveying device according to claim 8, wherein, at the delivery position, the pocket is preliminarily fed with the negative pressure.

11. The molded product conveying device according to claim 8, wherein, at the delivery position, the suction bore is not fed with the negative pressure.

12. The molded product conveying device according to claim 8, wherein, at the delivery position, the molded product is initially sucked to the pocket.

13. A molded product conveying device configured to suck a molded product to a plurality of rotators each rotating about a predetermined rotary axis and to convey the molded product along a rotation orbit, the conveying device comprising:
- a pocket disposed along an outer circumference of each of the rotators, recessed inward and opened outward radially and perpendicularly to the rotary axis, and fed therein with a negative pressure to suck the molded product; and
- a suction bore positioned to confront the pocket at a first end or a second end along the rotary axis of each of the rotators, opened toward the pocket to be at least partially overlapped with the pocket when viewed along the rotary axis, and fed therein with the negative pressure to suck the molded product, wherein the rotators are disposed adjacent to each other to have rotary axes parallel to each other.

14. The molded product conveying device according to claim 13, wherein the rotators each include a basal portion having a substantially circular disc shape when viewed along the rotary axis, and a flange expanding radially outward from an outer circumferential edge of the basal portion.

15. The molded product conveying device according to claim 14, wherein the basal portion includes the pocket disposed at an outer circumference, and the flange includes the suction bore positioned to confront the pocket.

16. The molded product conveying device according to claim 14, wherein, at a delivery position set as a predetermined position on a rotation orbit of the pocket and the suction bore, where the molded product is delivered between the adjacent rotators, the basal portion of a first rotator of the rotators and the basal portion of a second rotator of the rotators are substantially flush with each other.

17. The molded product conveying device according to claim 16, wherein the flange of the first rotator and the flange of the second rotator face each other along the rotary axes, and the suction bore at the flange of the first rotator is overlapped with the suction bore at the flange of the second rotator when viewed along the rotary axes.

18. The molded product conveying device according to claim 1, wherein the rotator includes a basal portion having a substantially circular disc shape when viewed along the rotary axis, and a flange expanding radially outward from an outer circumferential edge of the basal portion, the basal portion includes the pocket disposed at an outer circumference, and the flange includes the suction bore positioned to confront the pocket.

19. The molded product conveying device according to claim 18, wherein the suction bore includes a through hole penetrating the flange and having a closed peripheral edge, and is sized and shaped to have a peripheral edge located inside an outer edge of the molded product sucked to the suction bore when viewed along the rotary axis.

20. The molded product conveying device according to claim 1, wherein the conveying device is configured to be accompanied by an inspection device including a light source configured to irradiate the molded product sucked to the suction bore with light or an electromagnetic wave, and a light receiving element configured to receive the light or the electromagnetic wave having transmitted through the molded product and having passed through the suction bore.

* * * * *